(12) United States Patent
Cai et al.

(10) Patent No.: US 7,034,428 B2
(45) Date of Patent: *Apr. 25, 2006

(54) MULTI-SET RECTANGULAR COPPER HAIRPIN WINDINGS FOR ELECTRIC MACHINES

(75) Inventors: Wei Cai, Carmel, IN (US); David Fulton, Anderson, IN (US); Christopher L. Congdon, Fishers, IN (US)

(73) Assignee: Remy, Inc., Anderson, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/130,641

(22) Filed: May 16, 2005

(65) Prior Publication Data

US 2005/0206263 A1  Sep. 22, 2005

Related U.S. Application Data

(63) Continuation of application No. 10/438,429, filed on May 15, 2003, now Pat. No. 6,894,417.

(60) Provisional application No. 60/380,638, filed on May 15, 2002.

(51) Int. Cl.
*H02K 3/12* (2006.01)

(52) U.S. Cl. .................. 310/198; 310/184; 310/201

(58) Field of Classification Search ............. 310/179, 310/198, 201, 207, 215, 263
See application file for complete search history.

(56) References Cited

U.S. PATENT DOCUMENTS

| | | | |
|---|---|---|---|
| 5,903,073 A * | 5/1999 | Mukai | 310/64 |
| 6,051,906 A | 4/2000 | Umeda et al. | 310/179 |
| D425,857 S | 5/2000 | Umeda et al. | D13/122 |
| 6,060,802 A | 5/2000 | Masegi et al. | 310/68 D |
| D426,191 S | 6/2000 | Umeda et al. | D13/122 |
| 6,078,116 A | 6/2000 | Shiga et al. | 310/60 R |
| 6,097,130 A | 8/2000 | Umeda et al. | 310/263 |
| 6,144,136 A | 11/2000 | Umeda et al. | 310/254 |
| 6,147,432 A | 11/2000 | Kusase et al. | 310/260 |
| 6,181,043 B1 | 1/2001 | Kusase et al. | 310/201 |
| 6,181,045 B1 | 1/2001 | Umeda et al. | 310/201 |
| D438,509 S | 3/2001 | Umeda et al. | D13/122 |
| 6,198,190 B1 * | 3/2001 | Umeda et al. | 310/179 |
| 6,201,332 B1 | 3/2001 | Umeda et al. | 310/184 |
| 6,211,594 B1 | 4/2001 | Umeda et al. | 310/180 |

(Continued)

FOREIGN PATENT DOCUMENTS

FR    2808935    11/2001

*Primary Examiner*—Darren Schuberg
*Assistant Examiner*—Judson H. Jones
(74) *Attorney, Agent, or Firm*—Ice Miller LLP

(57) ABSTRACT

An electric machine having multi-set rectangular copper hairpin windings comprises a stator having a plurality of partially closed stator slots. A first winding set and a second winding set are positioned in the stator slots. The first winding set and the second winding set are connected by adjacent leg ends. According to a first embodiment, conductor layers in alternate slots alternate between different phases. The conductor layers in the remaining slots are all of the same phase. Hairpins having unequal length legs are used to implement the first embodiment. According to a second embodiment, conductor layers in alternate slots include one phase for the first winding set and another phase for the second winding set. The conductor layers in the remaining slots are all of the same phase. Hairpins having equal length legs are used to implement the second embodiment.

11 Claims, 24 Drawing Sheets

U.S. PATENT DOCUMENTS

| | | | |
|---|---|---|---|
| 6,291,918 B1 | 9/2001 | Umeda et al. | 310/215 |
| 6,333,573 B1 | 12/2001 | Nakamura | 310/45 |
| 6,346,758 B1 | 2/2002 | Nakamura | 310/217 |
| 6,373,163 B1 | 4/2002 | Oohashi et al. | 310/198 |
| 2001/0006312 A1 | 7/2001 | Sheeran et al. | 310/71 |
| 2001/0007169 A1 | 7/2001 | Takahaski et al. | 29/596 |

* cited by examiner

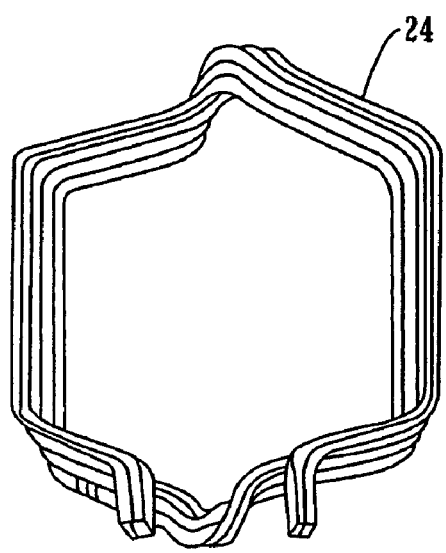
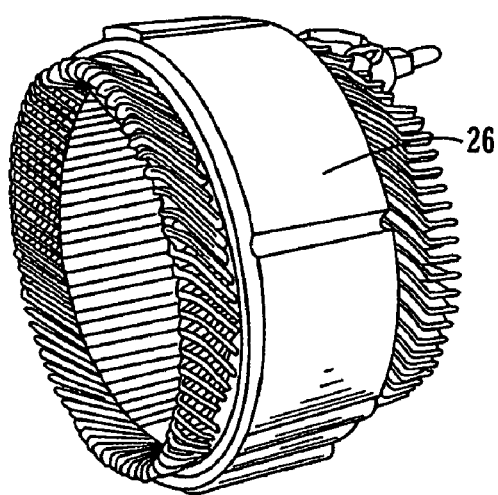
FIG. 3a
FIG. 3b

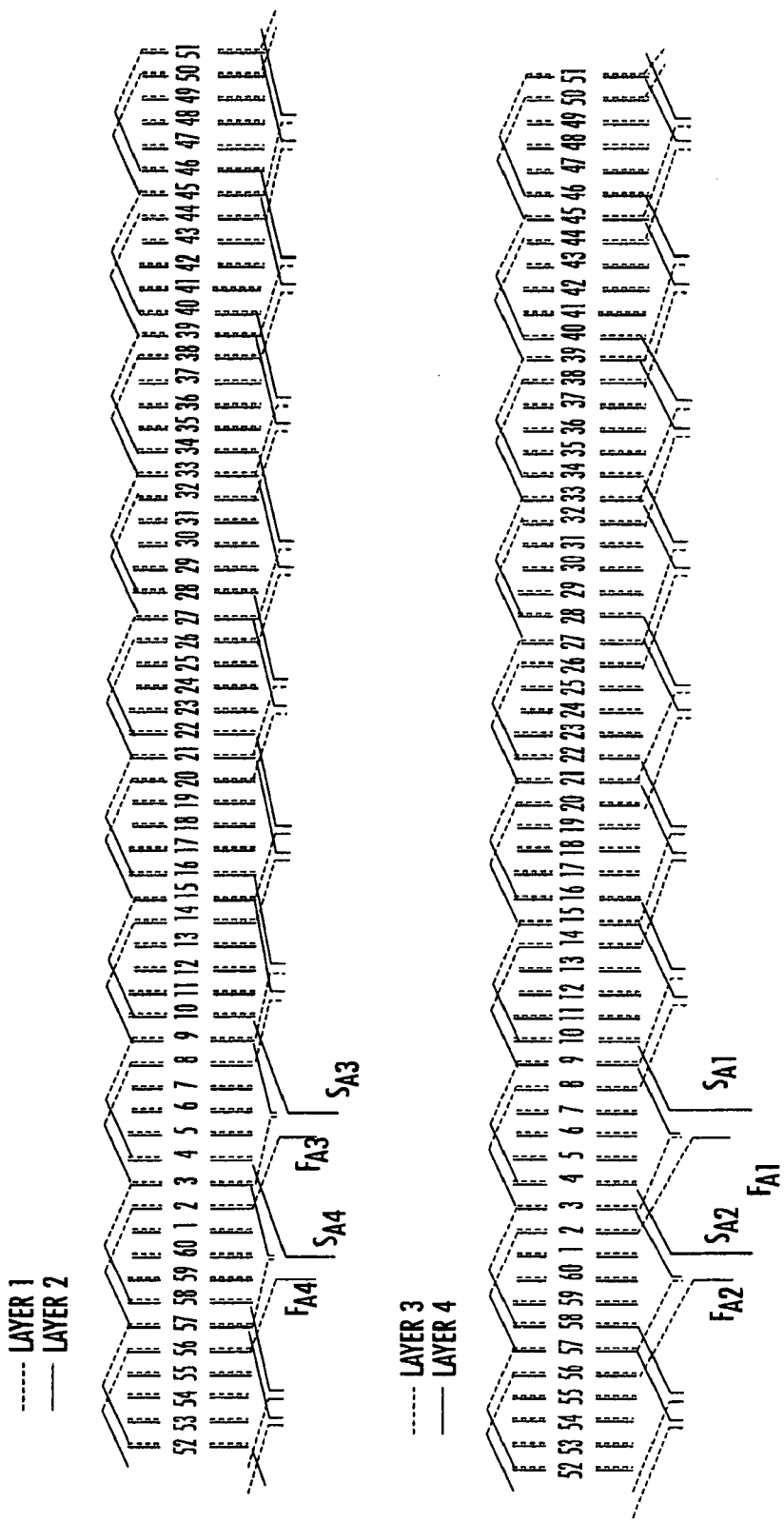

PHASE CONNECTIONS: (1) CONNECT $F_{B1}$ OF LAYER 3 AND $S_{B3}$ OF LAYER 2
(2) CONNECT $F_{B2}$ OF LAYER 3 AND $S_{B4}$ OF LAYER 2
(3) JUMPILY CONNECT $F_{B3}$ OF LAYER 1 AND $F_{B4}$ OF LAYER 1

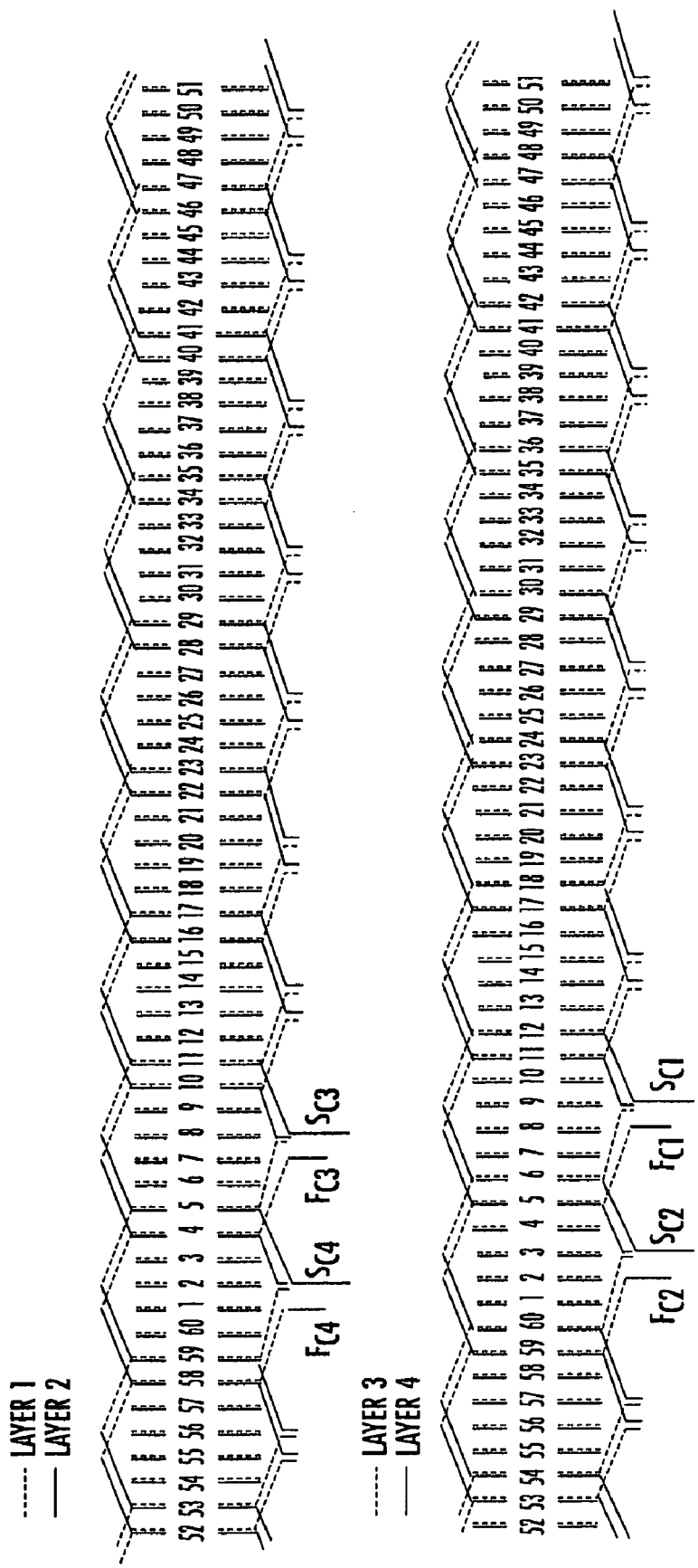

MULTI-SET RECTANGULAR COPPER HAIRPIN WINDINGS FOR ELECTRIC MACHINES

CROSS REFERENCE TO RELATED APPLICATIONS

This application is a continuation of U.S. Ser. No. 10/438,429, filed May 15, 2003 now U.S. Pat. No. 6,894,417, which claims the benefit of U.S. Ser. No. 60/380,638, filed May 15, 2002.

BACKGROUND

1. Field

This invention is related to winding technology of electric machines, and particularly hairpin wound electric machines.

2. Background Discussion

Electric machines are key components of conventional automobiles. Some electric machines serve as starting motors to crank automobile engines. Other electric machines serve as alternators that generate electricity from engine motion and deliver power to automobile loads. Electric machines are also very important in modern hybrid electric vehicles (HEVs) that combine an internal combustion engine with an electric drive system powered by a battery bank. In these hybrid vehicles, a single electric machine is typically required to operate as (a) a starter motor, (b) an electric drive assist (propulsion boost) as well as pure electric drive (propulsion), (c) a generator providing electric power for onboard electric loads and charging the battery banks, and (d) a re-generator acting to convert the kinetic energy of the vehicle to electric power for charging the battery bank during braking/deceleration of the vehicle.

Hybrid Electric Vehicles can operate with low fuel consumption and low air-pollution. There are two propulsion systems onboard the HEV: (i) the traditional diesel/gasoline engine and (ii) the electric drive system. The additional electric drive system consists of battery bank (energy storage component), power electronics unit (control components) and electric machine (conversion component—electrical to mechanical energy). The electric drive system provides propulsion and power generation as well as power regeneration.

The electric machine is a core component in the HEV's electric drive system. Based on driving schedule/requirements, the machine will run under the motoring state during vehicle starting, electric assist drive/propulsion or pure electric drive/propulsion. The electric machine is required to operate under the normal generating state during engine drive/propulsion (thereby charging batteries) and the re-generating state during vehicle braking. Obviously the efficiency of the electric machine will directly govern the efficiency of electric drive system and consequently the fuel economy of the vehicle.

As the power conversion component in an electric drive system, the electric machine interacts directly or indirectly (through a belt or mechanical converter/clutch) with the drive shaft or engine shaft and has to be located 'under the hood' of the vehicle. The space available for the electric machine in the required location is limited. Therefore, the size/dimensions of the electric machine must be as small as possible. Compared to other applications for electric machines, high efficiency and small size are more important to the electric machine onboard the HEV. However, automobile manufacturers are increasingly calling for high efficiency and small size for almost all electrical machine applications in vehicles. Therefore, the need for small and mid-sized electric machines having high efficiency and small size is applicable to all automotive vehicles, and is particularly applicable to HEVs and purely electric vehicles.

One way to reduce the size of an electric machine and increase efficiency is to increase the slot-fill-ratio of the electric machine. With reference to FIGS. 1(a) and 1(b), small and mid-sized electric machines include a stator 26 formed from a lamination stack. A plurality of slots 20 are formed in the stator. The stator slots are arranged in a circular fashion around the stator with an opening 22 to the slot that faces the rotor of the electric machine. The slots 20 of these electric machines are deemed "partially closed" or "semi-closed" because a neck 28 is formed near the opening to each slot, such that the width of the opening 22 is smaller than the width of the slot itself. A plurality of electric conductors 24, typically in the form of copper wires, are positioned in the slots of the stator.

As mentioned in the preceding paragraph, to design an electric machine with high efficiency and small volume, a high slot-fill-ratio (SFR) is preferred. The term "slot-fill-ratio" is typically defined as the ratio of (a) the aggregate cross-sectional area of the bare copper conductors in a slot to (b) the cross-sectional area of the slot itself. With high SFR, the large cross-sectional area of the copper wires helps reduce the phase resistance and consequently the resistance of the windings (i.e., power loss) for a given slot size, so the efficiency of the machine is improved. Accordingly, more efficient electric machines can be built at a smaller size than less efficient predecessors.

Armature windings of most small and mid-sized electric machines are typically wound in many turns with single or multiple strands of round magnetic wire. FIG. 1(b) shows an exemplary prior art stator slot having a plurality of round conductors in the stator slot. The SFR of the round wire machines can reach a maximum of 44% preventing the design of low loss (resistance), high efficiency electric machines. As discussed previously, this issue becomes even more critical when designing high efficiency machines for hybrid vehicles. Available space onboard hybrid vehicles is strictly limited, and therefore, boosting efficiency by increasing machine size becomes impractical.

One solution to increasing the SFR is to use rectangular wires in the stator slots in place of round wires, such as the arrangement shown in FIG. 1(a). Use of rectangular wires in the stator slots can increase the slot-fill-ratio up to 70% over that of round wires, allowing the SFR of rectangular wire machines to reach near 75% or higher. Unfortunately, the phenomena known as "skin effect" limits the size of conductors that may be used in the stator slots, especially the thickness of the conductor in the slots. "Skin effect" reduces the effective cross-sectional area of a conductor in a slot as the thickness of the conductor increases. Skin effect is especially prevalent in straight conductor segments at high speed operation. Accordingly, use of rectangular wires can increase the SFR, but the thickness of each rectangular wire relative to the slot height/depth has to be limited in order to reduce the skin effect of the conductors. Because the leakage flux linkage at different height/depth levels of a conductor in a given slot increases from the top to the bottom of the slot, the back EMF corresponding to the lower part of the conductor becomes higher than that at the top part of the conductor.

The back EMF due to slot leakage flux forces a great amount of current flow at the top part of the conductor. Accordingly, the current density in the conductor in a slot increases from the bottom of the slot to the top if all the conductors in the slot carry the same phase current as set forth in equation (1) below. If different phase currents are carried in a slot, the current density exhibits a complicated distribution. When the AC current flows in a conductor, skin effect will reduce the effective cross-sectional area of the conductor so the AC resistance of a conductor is larger than its DC resistance. The increase of AC resistance due to skin effect in rectangular slot depends on the penetrated depth, d, of electromagnetic wave, i.e., $$d = \sqrt{\frac{b_s}{b_c} \frac{\rho}{\pi f \mu}}$$ [equation (1)]

Where $\rho$ is the resistivity of the conductor; $f$ is the frequency of the AC signal; $\mu$ is the permeability of the conductor (roughly equal to the permeability of air for copper conductors), $b_c$ and $b_s$ are the widths of the conductor and the slot, respectively. Obviously the penetrated depth of electromagnetic waves will be reduced as frequency increases. Generally, there will be no current flowing at the lower part of the conductor in a slot if the thickness of the wire is triple the penetrated depth. Therefore, the thickness of rectangular wires in the slot should be made as small as possible.

If several strands of wires are laid in a slot, the leakage back EMF in a strand in the lower part of the slot will be higher than the leakage back EMF in the strand in the upper part of the slot under the effect of slot leaking flux. Circulating currents among the strands will be produced due to the unequal leakage back EMFs if the strands are welded together as one conductor at the end-turn segment, which will raise the power loss. To reduce or eliminate the circulating current in large electric machines, the winding bars are often composed of many strands of small/thin rectangular conductors whose positions are transitioned (such as 540° transitioned winding bar etc.) in the axial direction of a slot (see FIG. 2). Reducing the wire thickness in the stator slots helps to lower the negative skin effect and assists in achieving high efficiency in an electric machine with rectangular conductors. However, these winding bars have to be laid in open slots requiring special slot wedges (normally a magnetic slot wedge to reduce skin and air-gap effects). Because of this, such winding bars are too complicated to utilize in manufacturing of small and mid-sized electric machines, as they would dramatically increase the difficulty and cost of manufacturing, and reduce the reliability of the machines, especially in hybrid vehicle applications. Furthermore, it is not desirable to use open slots in many small and mid-sized electric machines. In middle and small size high frequency AC machines, Litz wires are often used for AC windings. Litz wires can help reduce circulating current and skin effects of AC windings, but the slot-fill-ratio cannot be improved with Litz wires. On the other hand, the transition of AC windings should be performed by a special design according to armature stack length in order to eliminate circulating current within windings, simply picking up available Litz wires may not reach the goal of eliminating circulating current. Furthermore, Litz wire windings are very difficult to handle during manufacturing, and would therefore contribute to manufacturing costs and present additional manufacturing hurdles.

To simplify the manufacturing and the keep high slot-fill-ratio of windings, pre-formed rectangular wires have been formed having straight conductor segments that are positioned in the stator slots, but twisted ends that form the end turns, as shown in FIG. 3. However, the pre-formed windings shown in FIG. 3(a) must be inserted through the slot opening to be inserted on the stator. Thus, these pre-formed windings can only be placed in open slots like the AC windings of FIG. 2 that are used for large electric machines. These windings can not be placed in the partially closed slots typically used for small and mid-sized electric machines because the restricted opening in a partially closed slot prohibits the windings from entering the slot.

To solve this problem, designers of small and mid-sized electric machines having partially closed slots have used conductor segments that may be inserted into the top and/or bottom of the slot and need not pass through the slot opening. To this end, the conductor segments are first bent into U-shapes, such that the conductor segments form a U-shaped end turn with two legs, such as that shown in FIG. 7(a) and/or 7(b). These conductor segments are often referred to as "hairpins" because of their shape. The U-shaped conductor segments may be inserted into the slots from one side of the lamination stack, legs first, with each leg positioned in a different slot. The leg ends of the hairpins extending through the slots (i.e., the open ends of the hairpins) are then bent to a desired configuration, as shown in FIG. 7(c), so each respective leg end may be joined to a different leg end according to the connection requirements of the windings. Finally the corresponding rectangular wires are connected into 3-phase or multi-phase AC windings.

This "hairpin" winding technology is already in application in many products such as Remy International, Inc.'s 50DN alternator (since the 1960's), shown in FIG. 3(b). The configuration of the windings shown in FIG. 3(b) (i.e., double layer windings with one strand per conductor) leads to high conductor thickness, which (among other reasons) causes severe skin effect and low efficiency (less than 50%).

To lower the skin effect while maintaining the high slot-fill-ratio of rectangular wire AC windings, each conductor could be composed of a plurality of thin rectangular wires or "strands", as shown in FIG. 4(a). Like the above-described hairpin winding process, the conductor with multi-strands could be transitioned at the end-turn, shaped into U-shapes and inserted into the slots from one side of the lamination stack. After all U-shape coils are inserted into slots, the open segments of the U-coils would be reshaped to the required shapes and connected into phase windings. One prototype of this technology is shown in FIG. 4(b). However, because of limitations of the number of slots and the available end-turn space, the practical application of FIGS. 4(a) and 4(b) is wave windings with one turn per coil since connecting wires between poles at lap windings could spoil the end-turn space. Therefore, this technology can be only used for low voltage AC windings like the FIG. 4(b) prototype. Furthermore, another manufacturing issue exists because of the difficulty in twisting multi-strand rectangular wires.

Another solution to the above-referenced problems involves shaping each strand into a single turn coil and then two U-shape coils are inserted into the slots, as shown in FIG. 5(a), instead of combining two strands in one conductor as shown in FIG. 4(a). Following the same procedure as hairpin winding manufacturing in FIG. 3(b), an automotive alternator which uses two sets of overlapping windings (i.e., one on top of the other) being connected with two separate rectifiers in parallel can be created. However, besides requiring two bridges, the overlapped windings increase the difficulty in manufacturing and the possibility for short-circuits. Furthermore, added end-turn length is required for overlapped windings (i.e., the size of the winding head is increased). This added length is undesirable in modern vehicles, such as the HEV where machine space is of much concern. In addition, the repair of overlapped windings is very difficult if not impossible, as one set of windings completely encompasses the other set of windings.

SUMMARY

An electric machine having multi-set rectangular copper hairpin windings comprises a stator having a plurality of partially closed stator slots. A first winding set is positioned in the stator slots. The first winding set comprises a first plurality of hairpins forming a first layer of conductors in the stator slots and a second layer of conductors in the stator slots. The first plurality of hairpins each include two legs, each leg having a leg end, and each leg end bent to a desired configuration to form adjacent leg ends between the first layer of conductors and the second layer of conductors. A second winding set is also positioned in the stator slots. The second winding set comprises a second plurality of hairpins forming a third layer of conductors in the stator slots and a fourth layer of conductors in the stator slots. The second plurality of hairpins each include two legs, each leg having a leg end, and each leg end bent to a desired configuration to form adjacent leg ends between (i) the second layer of conductors and the third layer of conductors and (ii) the third layer of conductors and the fourth layer of conductors. The second winding set is joined to the first winding set by connecting at least one or two of the adjacent leg ends per phase between the second layer of conductors and the third layer of conductors. Accordingly, the winding sets may be easily connected, such as through the use of an automatic hairpin winding connection machine.

The windings formed in the stator slots also provide for improved skin effects in the electric machine. According to a first embodiment, conductor layers in alternate slots alternate between different phases. The conductor layers in the remaining slots are all of the same phase. Hairpins having unequal length legs are used to implement the first embodiment. According to a second embodiment, conductor layers in alternate slots include one phase for the first winding set and another phase for the second winding set. The conductor layers in the remaining slots are all of the same phase. Hairpins having equal length legs are used to implement the second embodiment.

To manufacture an electric machine having multi-set rectangular copper hairpin windings, rectangular copper wires are cut to required lengths and pre-shaped as "U-shaped" hairpins with the appropriate coil pitch/span. The U-shaped hairpin conductors are inserted into rectangular slots of the lamination stack of the electric machine. After inserting the hairpins of one complete winding set, the open end-turns are bent in preparation for a wave-winding connection. The same procedure is repeated until all winding sets are installed. Finally, the connecting points between "hairpins" are welded into wave windings with one or two parallel paths per phase, depending on the winding design.

Accordingly, multi-set rectangular copper hairpin windings are provided that increase the slot-fill-ratio up to 75% or higher in the electric machine with semi-closed or closed slots. This is especially useful for hybrid vehicle applications. Combining semi-closed slots with low rectangular wire thickness (due to introducing multi-sets windings) reduces the skin effect, allowing high efficiency operation even at high speed. Furthermore, the multi-set rectangular hairpin windings provide an electric machine having side-by-side windings that provide for low manufacturing costs and low maintenance costs. The side-by-side winding sets also provide for winding arrangements that further reduce skin effects. This technology can be extended and used for other AC multi-phase (e.g., three phase) electric machines.

BRIEF DESCRIPTION OF THE DRAWINGS

FIG. 3(a) shows the twisting transition of an end winding used in some large electric machines;

FIG. 3(b) shows the stator of an electric machine using "hairpin" winding technology with double layer windings and one strand per conductor/layer;

FIGS. 19(a)–19(c) show a winding schematic for an electric machine having multi-set rectangular copper hairpin windings with legs of unequal lengths; and FIGS. 20(a)–20(c) show a winding schematic for an electric machine having multi-set rectangular copper hairpin windings with legs of equal lengths.

DESCRIPTION

Winding Overview

Figure 8A:
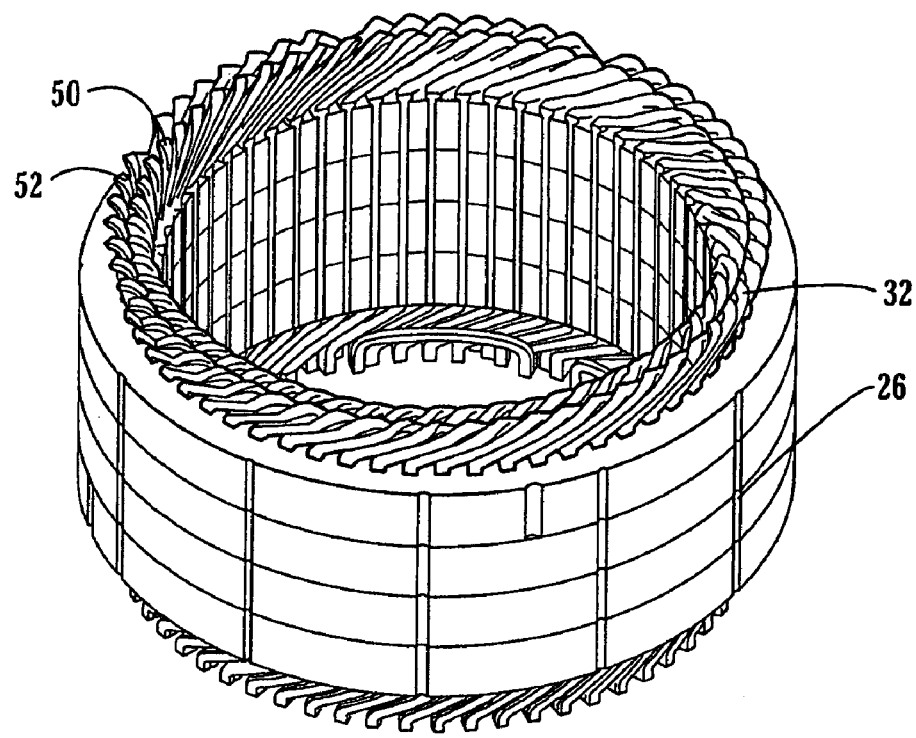
FIG. 8(a) shows a perspective view of a stator wound with rectangular copper hairpin windings comprised of two winding sets as viewed from the insertion end of the stator.
Figure 8B:
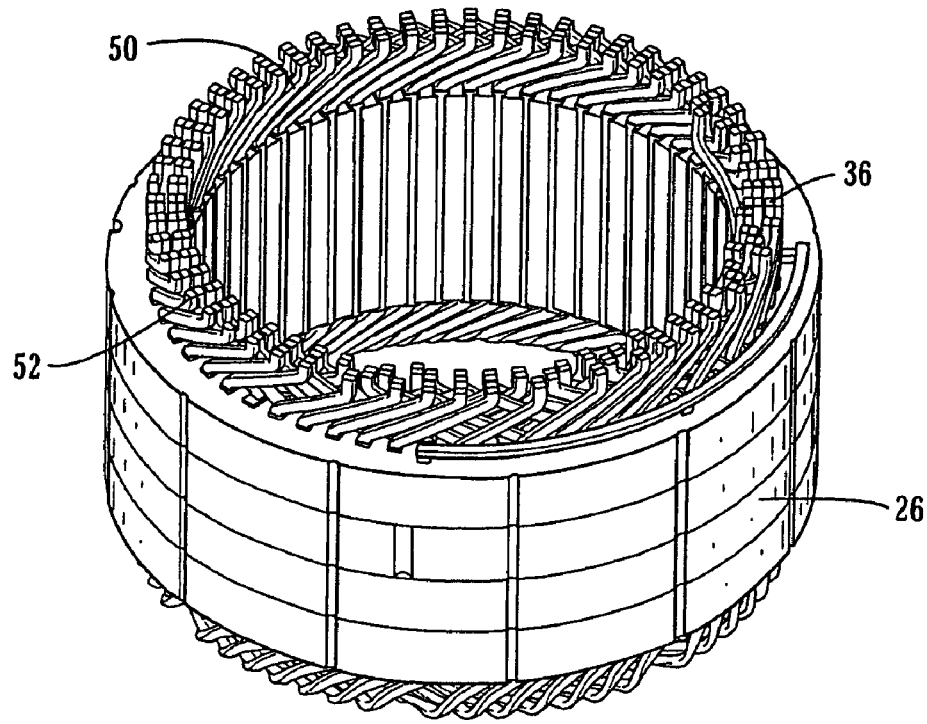
FIG. 8(b) shows a perspective view of the stator of FIG. 8(a) as viewed from the connection end of the stator.

With reference to FIGS. 8(a) and 8(b) an electric machine is shown having multi-set rectangular hairpin windings formed thereon. The electric machine comprises a stator having a plurality of partially closed slots. A plurality of conductor segments are positioned within the slots of the stator and form a plurality of winding sets upon the stator. Each of the winding sets includes a phase A winding, a phase B winding, and a phase C winding. The winding sets are each adjacent to each other upon the stator, with one of the winding sets forming an inner winding set 50 and another of the winding sets forming an outer winding set 52.

Figure 6A:
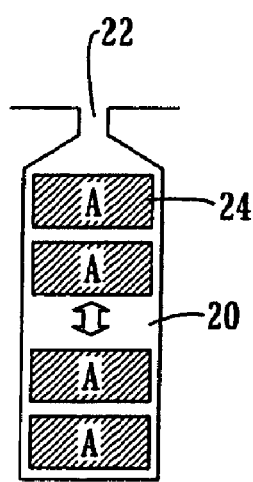
FIGS. 6(a), 6(b) and 6(c) show the skin effect sequence from high (FIG. 6(a)) to low (FIG. 6(c)), depending on conductor arrangements in a slot.

Each winding set is comprised of a plurality of conductor segments, also referred to herein as "hairpins," positioned within the slots of the stator. With reference to FIG. 7, each of the plurality of hairpins 30 includes a "U" shaped end turn 32 and two legs 34. Each of the plurality of hairpins has a rectangular cross-sectional shape. The legs of the hairpins are positioned in the slots of the stator with each leg of the hairpin in a different stator slot such that the U-shaped end-turn of the hairpin extends over several stator slots (e.g., each U-shaped end-turn may extend six stator slots). Each hairpin inserted into a stator slot is staggered or "interleaved" with respect to adjacent hairpins. When a hairpin is fully inserted into the slots of the stator, the U-shaped end turn 32 will extend from one end of the stator (i.e., the insertion end), and the legs will extend from the opposite end of the stator (i.e., the connection end). Any given stator slot will include a number of hairpin legs (e.g., 4), and each hairpin leg is referred to as a "layer" within the stator slot. FIG. 6(a) shows a cross-section of a stator slot having four layers of conductors (i.e., legs) carrying the same phase current in the stator slot. The layers are referenced herein as the innermost layer (i.e., the layer closest to the neck of the slot) being layer 1 and the outermost layer (i.e., the layer furthest from the neck of the slot) being layer 4. Insulation 38 is included on the portion of each leg situated within a stator slot to prevent electrical connection between the legs in different layers of the same stator slot. The insulation 38 may alternatively take the form of slot insulation provided inside each slot and between conductors.

Figure 17:
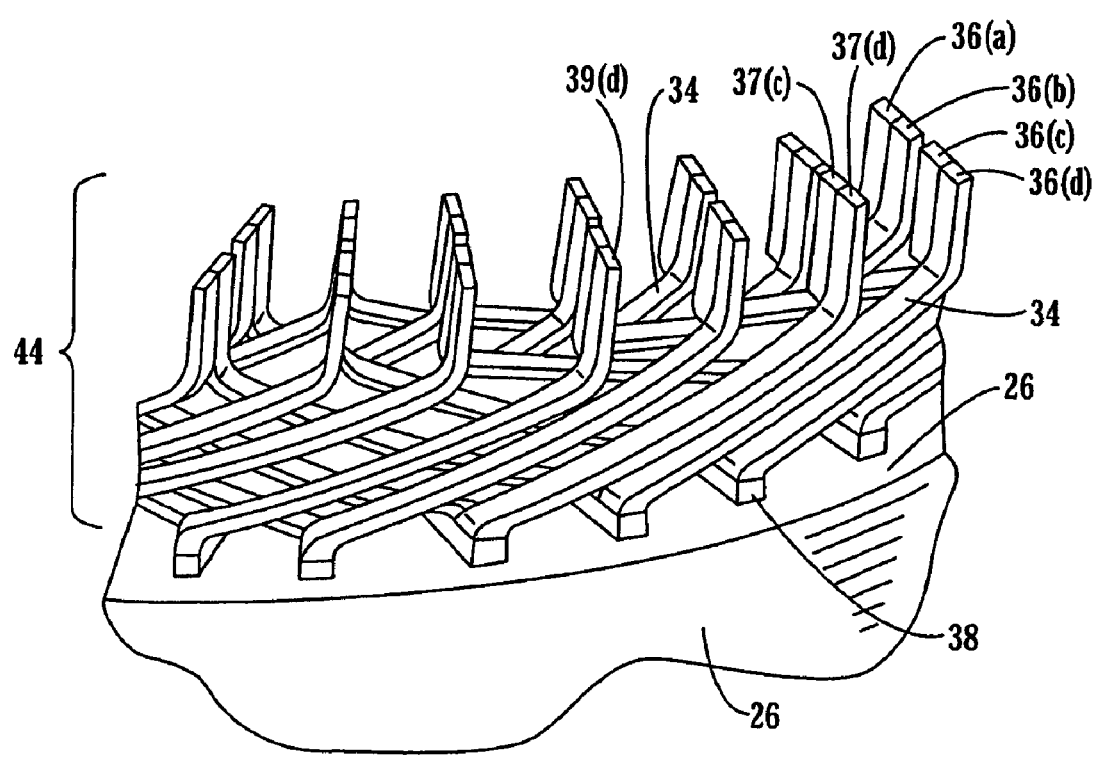
FIG. 17 shows an enlarged view of adjacent leg ends as viewed from the connection end of the stator.

The portions of the hairpin legs extending from the stator slots are bent in a desired configuration. To reduce winding height the legs on alternating layers are bent in opposite directions (e.g., the legs on layer one are bent counter-clockwise in the same direction and the legs on layer two are bent in the opposite direction, clockwise). The number of stator slots that each leg is bent is determined upon the design of the electric machine (e.g., each leg may be bent three slots so that the hairpin extends a total of twelve slots from end-to-end in wave windings, if the end turn of each side extends six slots). FIG. 17 shows a close-up view of a typical arrangement of the ends of the hairpin legs extending from the stator slots. As shown in FIG. 17, the legs are bent such that each leg end 36 is positioned adjacent to another leg end. This allows an electrical connection to be easily established between each adjacent hairpin leg. In particular, once all hairpin legs are inserted into the stator and bent, an automated connection device is used to weld legs together. For example, adjacent legs 36(a) and 36(b) may be welded together and adjacent legs 36(c) and 36(d) may be welded together. Similar welds would be made for other adjacent legs around the stator. The automatic connection device may also provide insulation that covers the ends of the legs to prevent electrical shorts between two nearby legs that are not intended to be connected. The term "adjacent leg ends" is used herein to refer to two hairpin leg ends from different hairpins that are immediately adjacent to one another (such as leg ends 36(a) and 36(b) and leg ends 36(c) and 36(d) of FIG. 17) when the legs are bent into the proper arrangement in the stator core. Non-adjacent leg ends are any leg ends that are not adjacent leg ends (e.g., leg ends diagonally opposed to each other such as leg ends 37(c) and 36(d) of FIG. 17, and leg ends removed by several positions such as leg ends 36(d) and 39(d) of FIG. 17). This portion of the stator winding extending above the stator core forms the winding head 44.

Figure 18A:
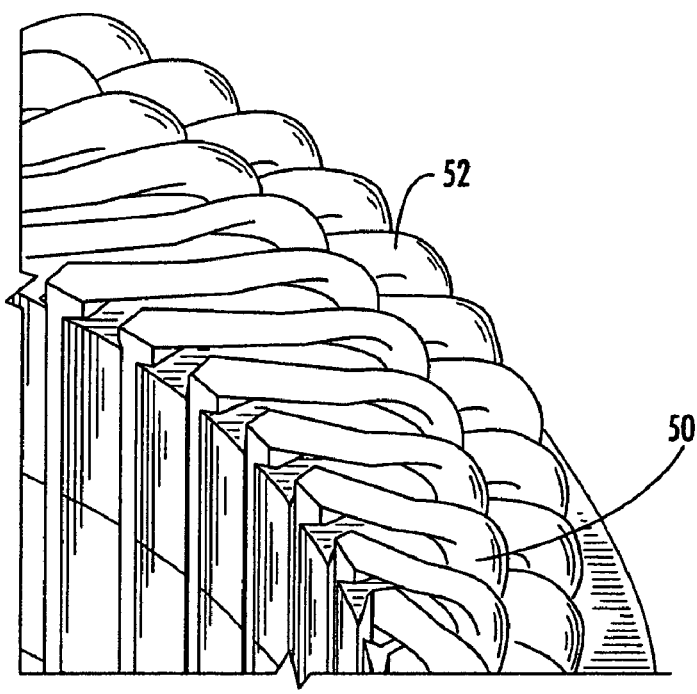
FIG. 18(a) shows an enlarged perspective view of the U-shaped end turns of side-by-side winding sets as viewed from the insertion end of the stator.
Figure 18B:
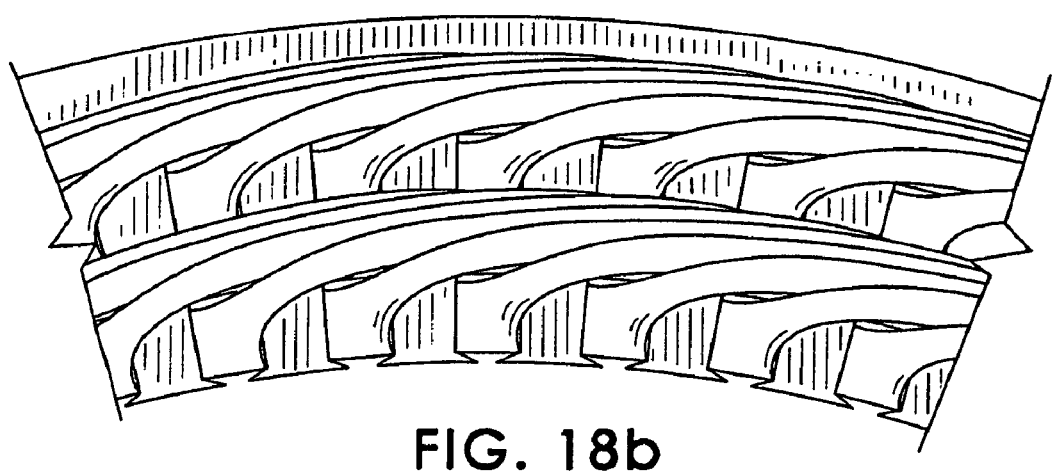
FIG. 18(b) shows an enlarged top view of the U-shaped end turns of FIG. 18(a)

On the opposite side of the stator from the hairpin leg ends, the U-shaped end turns of the hairpins extend from the stator slots. FIG. 18 shows a close-up view of the U-shaped end turns of the hairpins extending from the stator slots. As shown in FIG. 18, the U-shaped end turns form (i) a inner winding set 50 comprising a first group of end-turns, and (ii) an outer winding set 52 comprising a second group of end-turns positioned on the exterior of the stator slots. The winding sets do not overlap each other (i.e., the U-shaped end turns from different winding sets do not overlap each other), but instead the winding sets are "side-by-side" (i.e., concentrically positioned next to each other such that the U-shaped end turns are non-overlapping). The non-overlapping U-shaped end turns of the inner winding set and the outer winding set allow for the winding schematics shown in FIGS. 19 and 20 to be realized. As described in more detail below, each of these winding schematics provides for electric machine windings having high slot-fill-ratio, low skin effects, low manufacturing costs and low maintenance costs.

Winding Design to Account for Skin Effect

As described above, two or more double layer winding sets are embedded side-by-side in armature slots (creating at least one inner and one outer winding set). The winding coils are made with rectangular copper hairpin conductors. The number of winding sets depends on the required thickness of the rectangular conductor to meet the needs of system voltage and low skin effect. A conservative rule-of-thumb is to determine the thickness, h, of each conductor in a slot is:

$$h = \frac{1.32}{\sqrt{m}} \qquad [\text{equation (2)}]$$

$$d = \frac{1.32}{\sqrt{m}} \sqrt{\frac{b_s}{b_c} \frac{\rho}{\pi f \mu}}$$

where m is the number of conductors in the direction of slot height (i.e., distance from outer periphery of slot to inner periphery of slot where opening is fount); d is the penetrated depth of electromagnetic wave, given in equation (1); and the other variables and constants are the same as provided above for equation (1). Considering manufacturing cost and complexity, 2 to 3 sets of windings (with a maximum of 4 winding sets, in spite of a theoretically unlimited number of winding sets) are more practical in AC winding manufacturing.

Figure 6B:
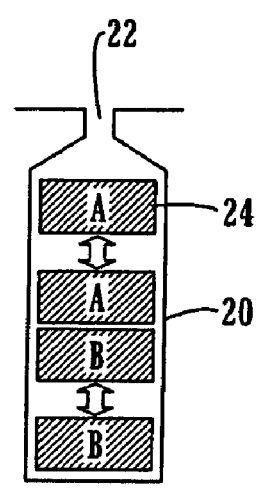
Figure 6C:
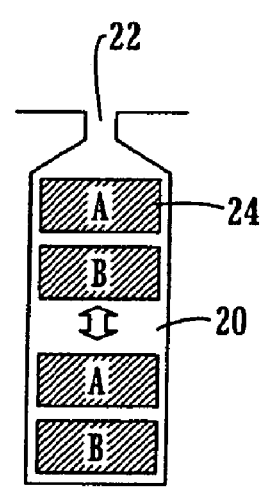

It has been determined that conductors in a slot carrying different phase currents will produce lower skin effects in double layer windings than those conductors in a slot all carrying the same phase currents. FIG. 6 shows a number of different conductor arrangement/phase current configurations for a slot carrying two winding sets. The sequence of skin effects from high to low order in FIG. 6 is from FIG. 6(a) to FIG. 6(c). In other words, the arrangement shown in FIG. 6(a) will produce higher skin effects than the arrangement of FIG. 6(b), and the arrangement of FIG. 6(b) will produce higher skin effects than FIG. 6(c). Thus, it is advantageous to produce a winding configuration where as many of the slots as possible resemble the arrangement of FIG. 6(b) or FIG. 6(c), with FIG. 6(c) being the most advantageous arrangement.

Based on FIG. 6, the coil pitch, $Y_1$, in the three phase AC windings would be better within $(1/3)\tau < Y_1 \leq (2/3)\tau$, where $\tau$ is the pole pitch in slots. Unfortunately, the copper utilization of AC windings will be very low at low coil pitch such as $Y_1 < (2/3)\tau$. For practicality, the coil pitch of $(2/3)\tau < Y_1 \leq 1$ is used in most high efficient electric machines. Likewise, as shown in FIGS. 19 and 20, a coil pitch of $Y_1 > (2/3)\tau$ is used herein to describe the exemplary winding configurations that utilize multi-set rectangular copper hairpin windings while providing for lower skin effect.

Procedures of Winding Manufacturing

Figure 19B:
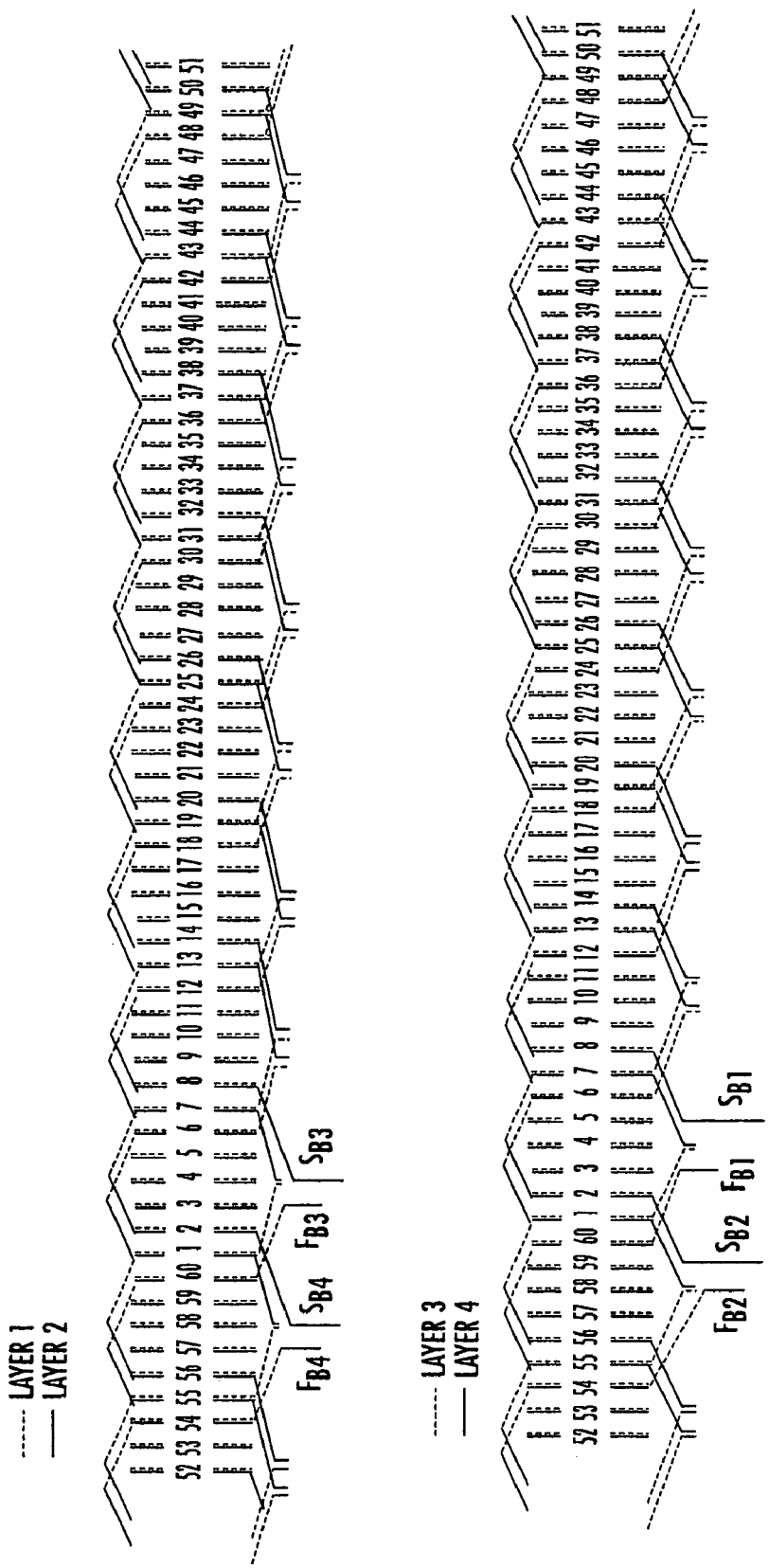
Figure 19C:
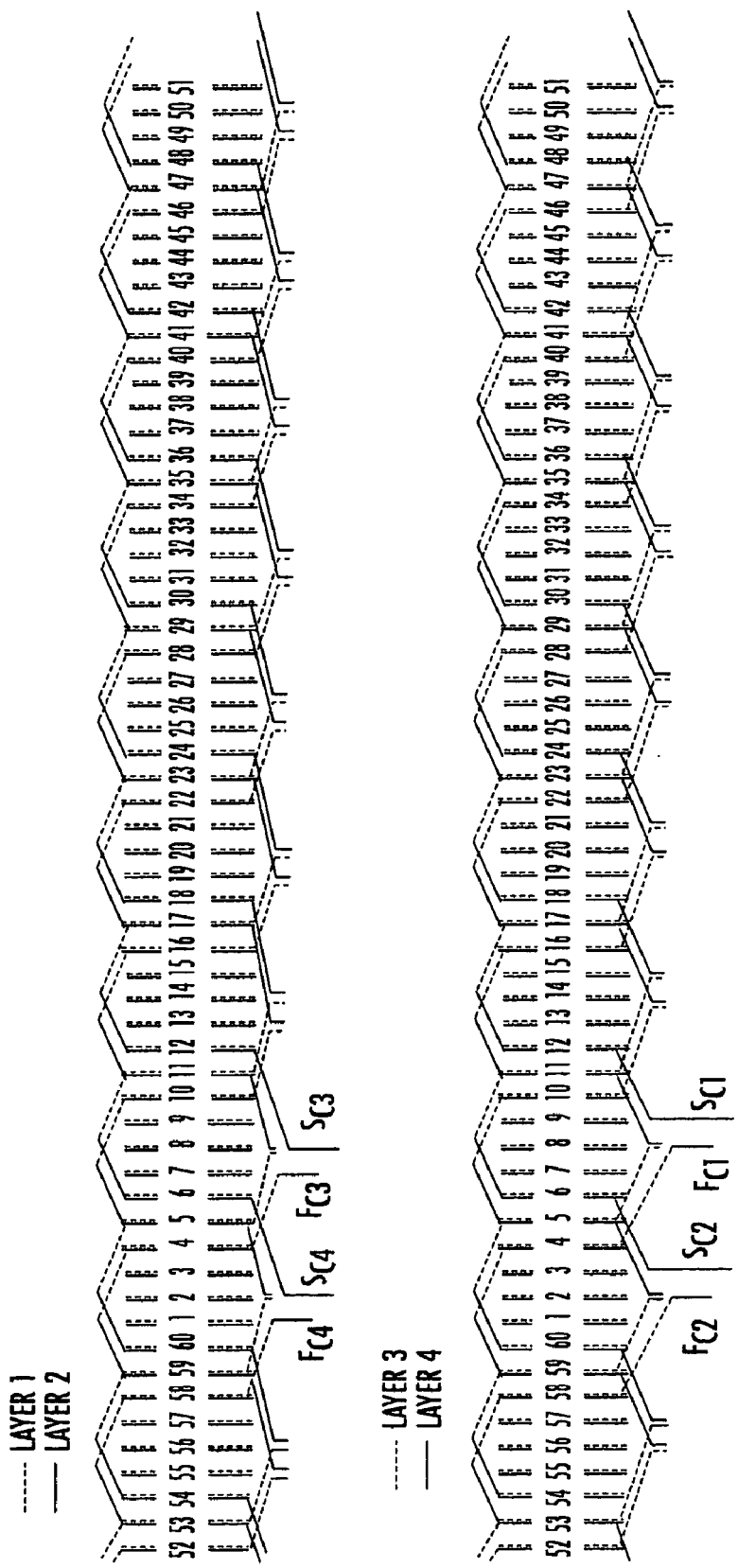
Figure 20A:
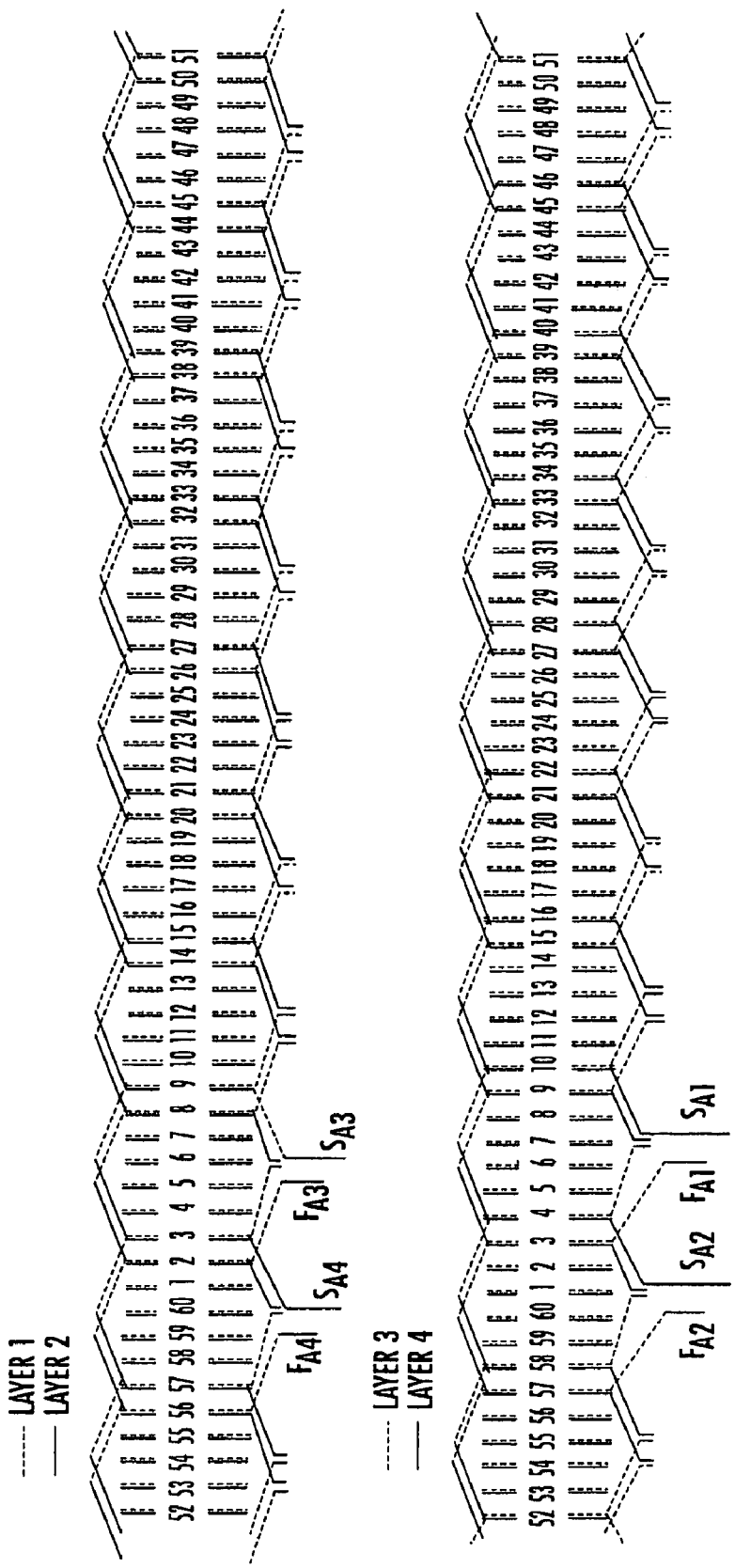
Figure 20B:
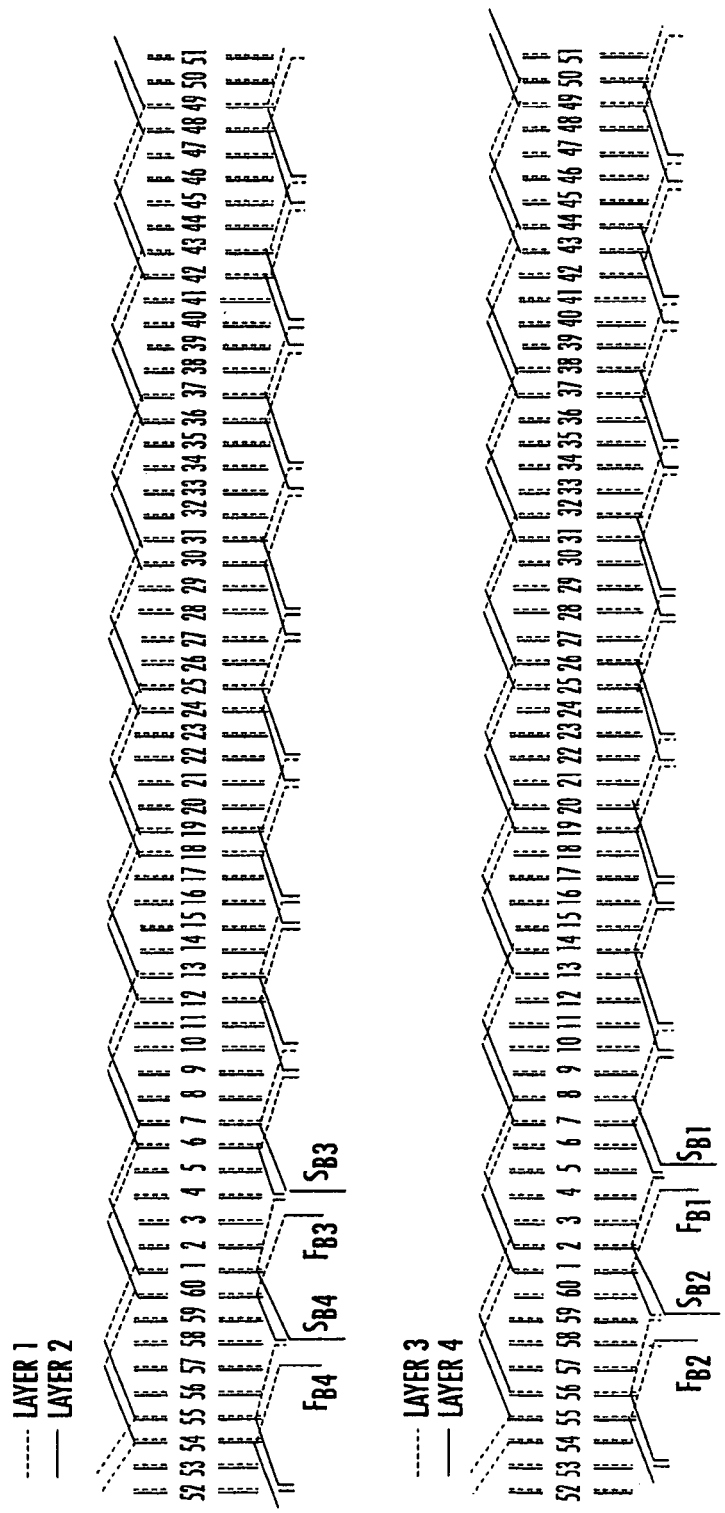

The following procedural steps are used in the manufacturing of the windings shown in FIGS. 19 and 20, that provide multi-set copper rectangular hairpin windings with lower skin effects.

(A) At first, the rectangular copper wire is cut into elements. It should be noticed that the length of elements of the inner winding set is slightly different from the length of the outer winding set elements due to different diameters of winding set locations. There are also two shorter pitch elements (one slot shorter, compared to the others) with per phase per winding set if the windings are connected into wave windings.

Figure 7A:
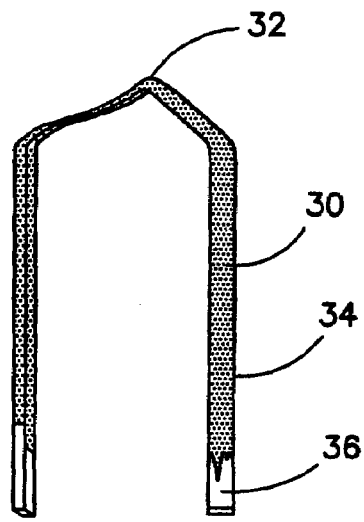
FIGS. 7(a), 7(b) and 7(c) show the progression of a single element of a rectangular copper hairpin winding from its shape before insertion into a slot (FIG. 7(a)) to its shape after insertion into a slot (FIG. 7(c))

(B) Based on pitch requirements, the rectangular wires are bent into U-shapes, as shown in FIG. 7(a). Because the thickness of each wire in the slot height direction is reduced by increasing the number of windings sets, the twisted end-turn 32 in FIG. 7(a) can be replaced by a flat bent end-turn, which can reduce the manufacturing complexity. In fact, as described below, the length of U-shape hairpin legs can be either equal or unequal, based on practical requirements.

Figure 7B:
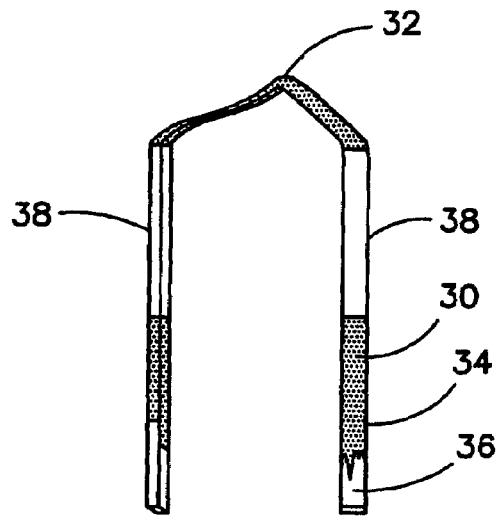

(C) The U-shape rectangular wire is insulated by rectangular insulation tube or bounding insulation, as shown in FIG. 7(b). However, the tube insulation can be eliminated if traditional slot insulation is used (e.g., slot liners and/or existing wire enamel that provides the proper insulation for the electric machine's voltage rating).

(D) All conductor elements of one complete winding set are inserted into the stator slots. Generally, the inner set or top set (i.e., the set at top of slot) is inserted first, although other sequences are possible.

Figure 7C:
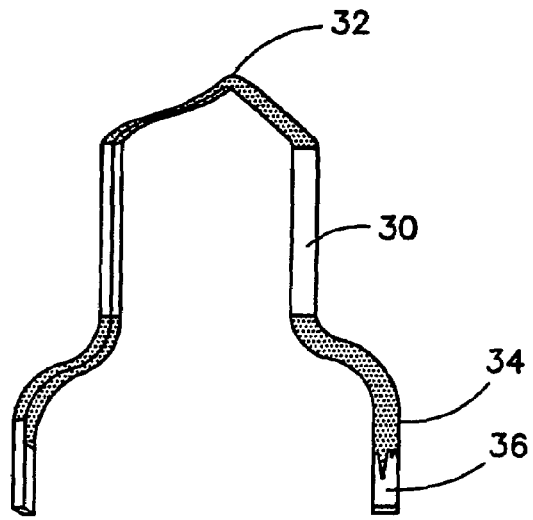

(E) The legs of all the U-shape hairpins are bent into "frog-shape" with an automatic bending machine. Typically, the legs of one layer are bent in the clockwise direction and the legs of the adjacent layer are bent in the counterclockwise direction. A bent hairpin element removed from the slots is shown in FIG. 7(c).

(F) Next, procedures (D) and (E) above are repeated for the remainder of sets until the winding sets are all positioned upon the stator. A hairpin winding with double sets is shown in FIG. 8.

(G) Finally, connections are made between the leg ends to complete the winding end turns and make the connections according to the winding schematic. Most of the required connections are between adjacent leg ends. However, a few of the connections require jumpers.

End-Turn Connections

Figure 1A:
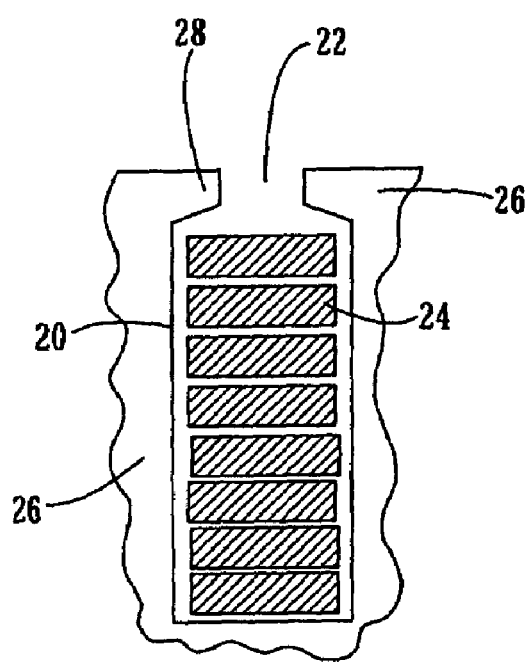
FIGS. 1(a) and 1(b) show a comparison of rectangular wires (FIG. 1(a)) and round wires (FIG. 1(b)) in the slot of an electric machine.
Figure 1B:
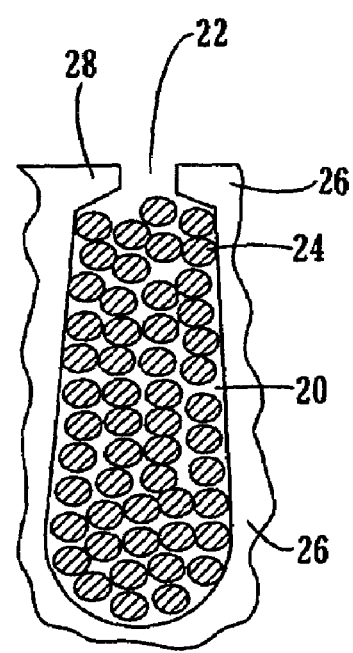
Figure 2:
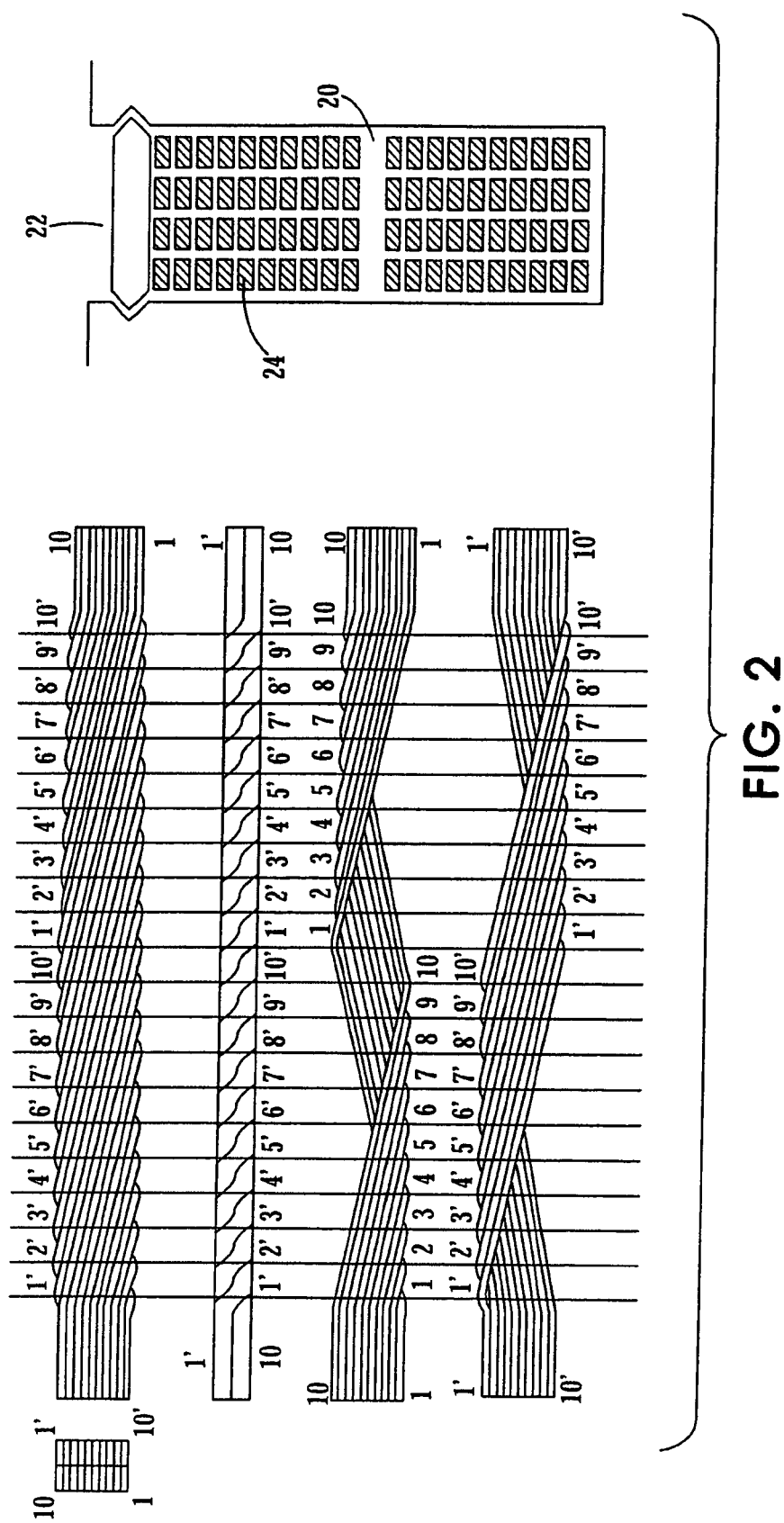
FIG. 2 shows transitioned winding bars as used in the slots of large electric machines.
Figure 4A:
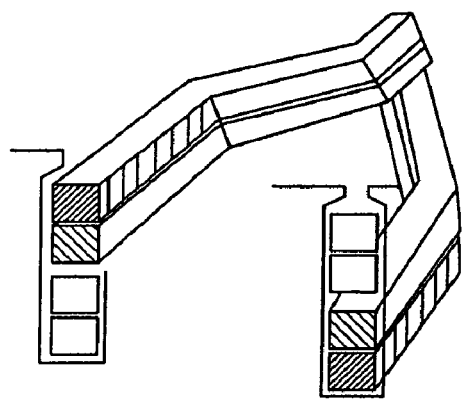
FIG. 4(a) shows a multi-strand hairpin winding used in some electric machines.
Figure 4B:
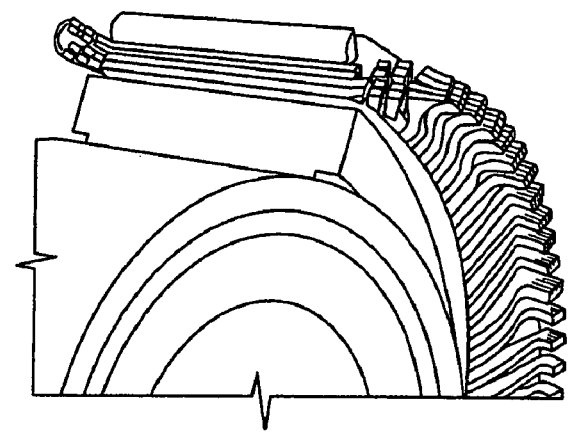
FIG. 4(b) shows a prototype electric machine using the winding of FIG. 4(a)

End-turns are used for connecting the effective segments of elements in slots. To reduce resistance losses and leakage, end-turns are required to be kept as short as possible. The available mounting space on the vehicle also limits the overall length of the electric machine so the shorter end-turns are preferred. Compared to a conductor composed of strands, such as that shown in FIG. 4, the multi-set rectangular hairpin winding is beneficial in making the end-turn shorter. An additional advantage is heat expulsion through the stator stack (e.g., enclosed air-cooling, indirect liquid cooling, etc.). Conversely, end-turns are used to expel heat in the winding if direct oil cooling or open circulating air cooling system is employed. The end-turns must have enough surface area and clearance between conductors for desired heat rejection. A reasonable length of end-turn is chosen according to electric and thermal requirements as well as physical limitations on end turn length.

Unlike the end-turn length, the jumpers or connections between poles, winding sets, phases, paths, etc., do not contribute much to machine cooling so the length is kept as short as possible. To reduce the number of connections like these, wave style winding is better than lap style. The following end-turn connection methods provide significant advantages.

(i) Rectangular Hairpins with Unequal Legs

According to AC winding theory, in order to reduce MMF harmonics with low orders ($5^{th}$ and $7^{th}$ mainly), the "first pitch" of the windings (i.e., $Y_1$, the number of slots between legs connected by the U-shaped end turn, the "winding pitch") should be as near $(5/6)\tau$ as possible (where $\tau$ is pole pitch in slots). This causes the pitch of connections between winding sets to be near $(4/3)\tau$ while the "second pitch" (i.e., $Y_2$, the second pitch of windings, and particularly the number of slots between conductors that are connected at their leg ends, the "connection pitch") within a winding set is near $(7/6)\tau$. To accomplish the above pitch arrangement using hairpins having legs of equal length, the connections between winding sets have to be extended in an axial direction, thereby increasing the overall length of the machine. In other words, the connections between winding sets require connection between non-adjacent leg ends, and such connections require jumpering that increases the height of the winding head. However, the use of hairpins with legs of unequal length can avoid the need to extend the connections between winding sets in the axial direction.

Figure 9:
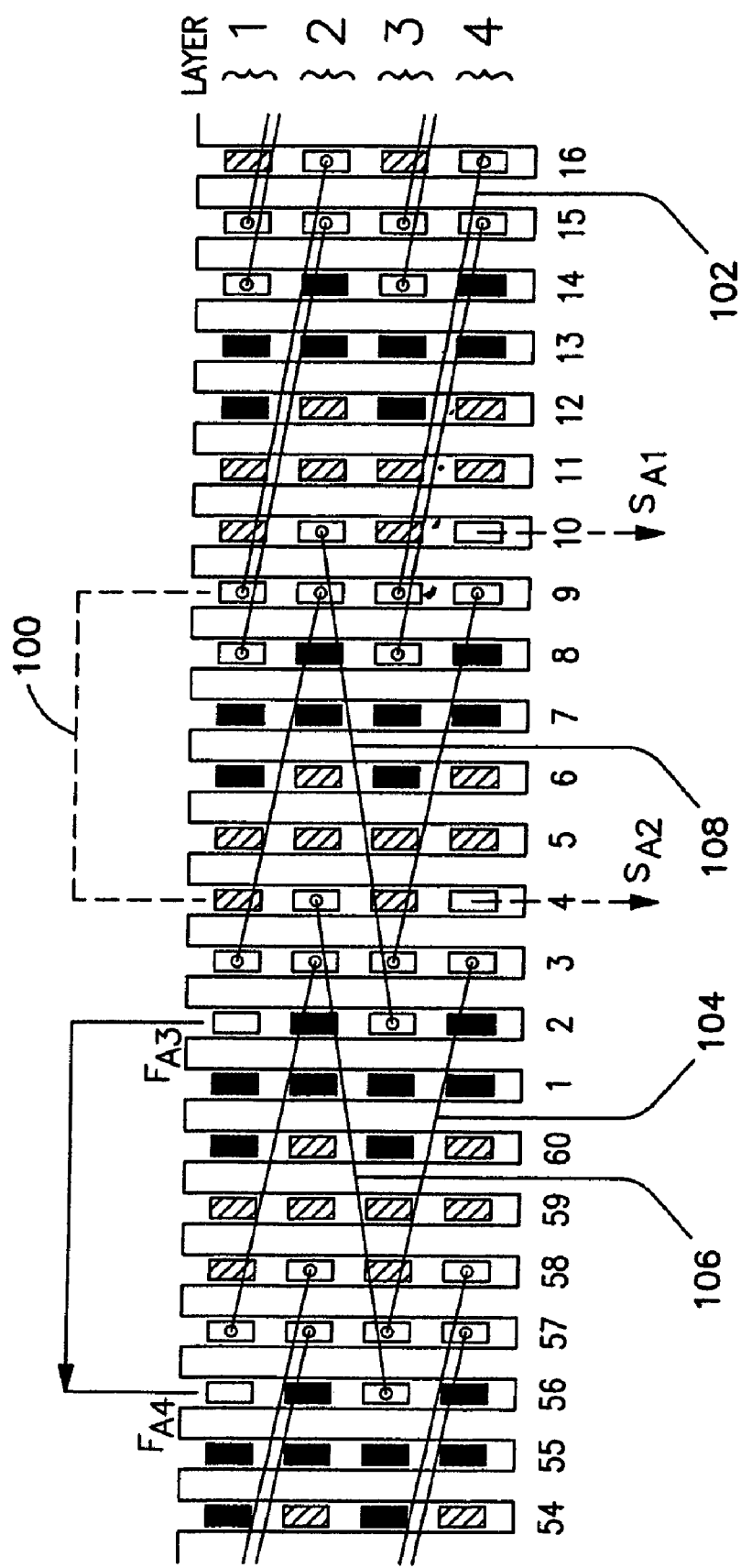
FIG. 9 shows the end-turn connections of one winding phase for a double winding set having hairpin legs of unequal length.

As an example of the above, consider a three phase, two-set AC winding with 10 poles and 60 slots, such as that shown in FIG. 19. A detailed look at the end-turn jumpers and some connections that are required for phase A of this arrangement are shown in FIG. 9. In this example, the layers are defined as the $1^{st}$ through $4^{th}$ from the top to the bottom of a slot. The $1^{st}$ & $2^{nd}$ layers consist of winding set 1 while the $3^{rd}$ & $4^{th}$ layers consist of winding set 2. The lines superimposed over the conductor layers show the connections between hairpin leg ends on the connection end of the stator. The clear rectangles represent phase A, the darkened rectangles represent phase B, and the striped rectangles represent phase C. Of course, the conductor layers are also connected by U-shaped end turns at the insertion end of the stator, but these connections are not provided for clarity in FIG. 9. The first pitch $Y_1$ of the windings (hairpin pitch) is 5 (this is the number of slots that the U-shaped end turns span). For example, starting at layer 4 in slot 4 and following dotted reference line 100 to layer 3 of slot 9, it can be seen that this connection extends 5 slots. The second pitch, $Y_2$, of the windings (hairpin connection within a set) is 7. For example, starting at layer 3 in slot 9 and following reference line 102 to layer 4 of slot 16, it can be seen that this connection extends 7 slots. It should also be noted that there exist 2 connections per set per phase that have a shorter $Y_2$ by one slot (e.g., starting at layer 3 in slot 57 and ending at layer 4 in slot 3, as represented by reference line 104, the second winding pitch is only 6 instead of 7). The connection pitch between winding sets 1 & 2 is 8 (e.g., as shown by reference line 108, starting at layer 3 in slot 2 and ending at layer 2 in slot 10).

To connect all rectangular hairpins in one level of axial length, the ends of hairpin legs to be connected between winding sets have to be aligned with each other (i.e., adjacent leg ends). To accomplish adjacent leg ends according to the winding schematic of FIGS. 9 and 19, hairpin legs with unequal length are required. Accordingly, all legs in the $1^{st}$ layer in FIGS. 9 and 19 (i.e., the innermost layer with reference to FIG. 8(*b*)) are bent across 3 slots counter-clockwise while legs at the $2^{nd}$ layer (except shorter $Y_2$ between hairpins) are bent across 4 slots clockwise. For winding set 2, legs at layer 3 (except shorter $Y_2$ between hairpins) are bent across 4 slots counterclockwise, while all legs at layer 4 are bent 3 slots clockwise. In this way, all the end-turns connections to be made as shown in FIG. 19 are between adjacent leg ends (with the exception of the one jumper connection between $F_{A3}$ and $F_{A4}$), including the connections between winding sets from layer 2 to layer 3 (i.e., the connection between $F_{A2}$ and $S_{A4}$, noted by reference line 106, and the connection between $F_{A1}$ and $S_{A3}$, noted by reference line 108). Because the connections between adjacent leg ends may be made by an automatic connection machine, and jumpers or other extended connections are not required, the required connections between the hairpins may be made without raising overall length of the electric machine.

Figure 10:
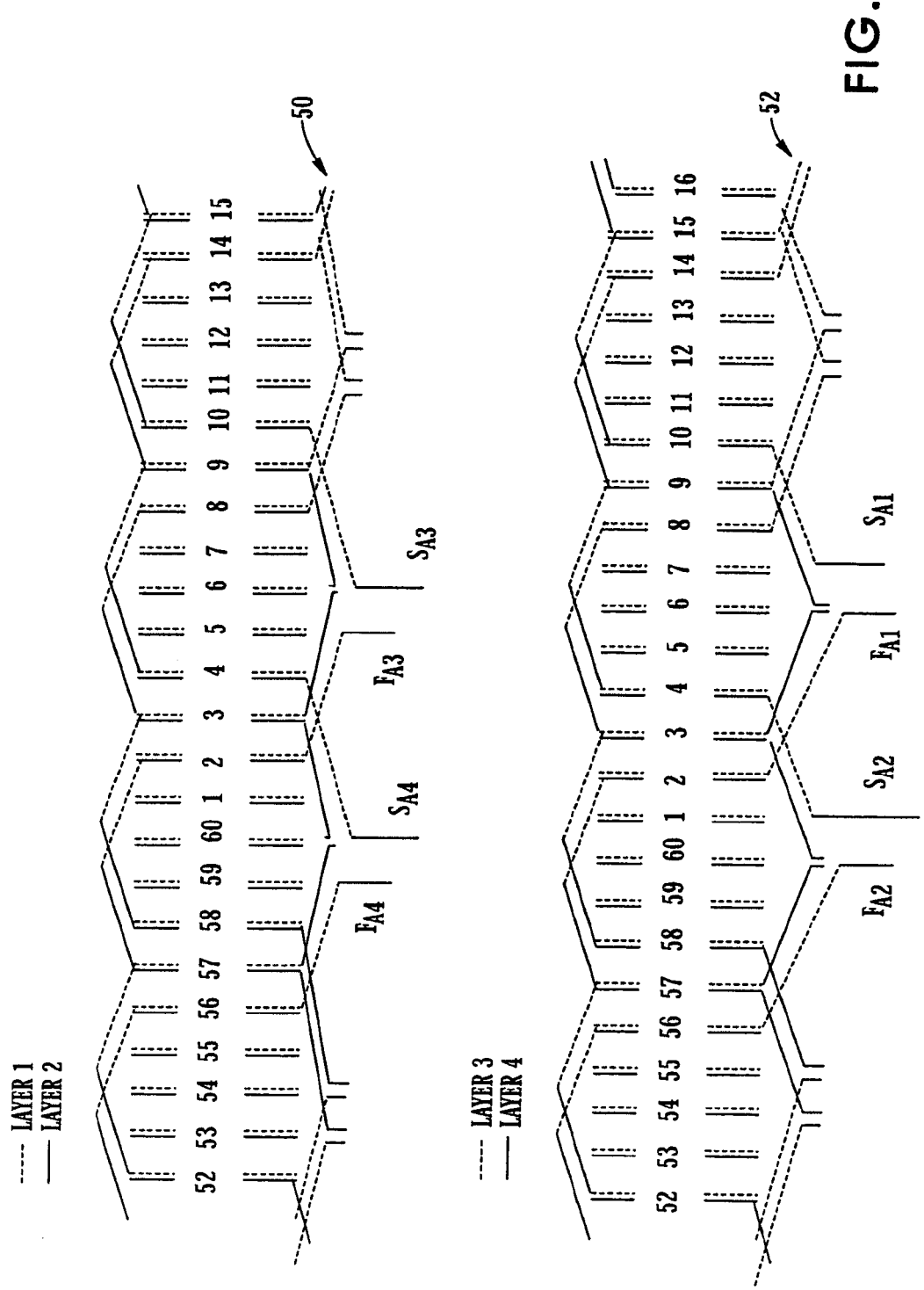
FIG. 10 shows a distributed graph of two sets of rectangular copper hairpin windings for the double winding set of FIG. 9.

The bending and connecting is shown as a distributed graph in FIG. 10, which shows the phase A winding schematic for slots 52–16. As noted above, connecting $F_{A2}$ with $S_{A4}$ in FIG. 10 corresponds to the connection between winding sets starting at layer 3 in slot 56 and ending at layer 2 in slot 4. Connecting $F_{A1}$ with $S_{A3}$ in FIG. 10 corresponds to the connection between winding sets starting at layer 3 in slot 2 and ending at layer 2 in slot 10. To complete the winding set, the same procedure is repeated for connecting hairpins in phases B and C as in phase A. Finally, the two sets of rectangular hairpin windings are connected into one path per phase through connecting $F_{A4}$ and $F_{A3}$ and Y-connection of three phases. The winding arrangement shown in FIG. 19 not only provides the advantages of reduced harmonics associated with short pitch winding, but also provides for connection between side-by-side winding sets using adjacent leg ends. By providing for easy connection between hairpins, including easy connection between winding sets through adjacent leg ends, the overall length of the electric machine does not need to be increased. In addition, only three jumpers are required for the complete winding set shown in FIG. 19.

Another significant advantage of the winding arrangement shown in FIG. 19 (i.e., hairpin connections using hairpins with unequal legs) is a number of slots having different phase currents. As discussed previously, low skin effect is realized in slots with different phase currents due to the arrangement of the phase conductors. For instance, the conductors carrying A, B, A, B phase currents in slot 8 of FIG. 9 reduce the skin effects as explained above with reference to FIG. 6(*c*). As best shown in FIG. 9, the winding arrangement of FIG. 19 provides reduced skin effects, as the conductor arrangement in all even numbered slots is that of FIG. 6(*c*). In particular, the first and second layers (i.e., the conductors included in the first winding set) in all of the even numbered slots carry different phase currents and the third and fourth layers (i.e., the conductors included in the second winding set) in all the even numbered slots also carry different phase currents, with the pattern of phase currents in layers one and two being the same as the pattern of phase currents in layers three and four. At the same time, all of the layers in the odd numbered slots carry the same phase current. (The terms "even numbered slots" and "odd numbered slots" are used herein to reference alternating slots. Choice of slot numbering is a design choice, and the terms "even numbered slots" and "odd numbered slots" are not intended to serve any limiting purpose other than to reference alternating slots. Accordingly, the conductor arrangement in each slot of the winding schematic shown in FIG. 19 alternates between the configuration shown in FIG. 6(*a*) and the configuration shown in FIG. 6(*c*). The improved skin effect in the even numbered slots minimizes skin effect in the windings, as described previously with respect to FIG. 6(*c*).

(ii) Hairpins with Equal Legs for Even Number of Winding Sets

If the number of winding sets is even, such as 2 or 4 etc. (and especially for 2 sets), an alternative embodiment of the invention can be implemented where the short pitch for reduction of harmonics is performed by shifting the proper number of slots between sets of the full pitch windings. This gives an opportunity to build hairpins with equal legs while the harmonics are still depressed. In this embodiment, all rectangular hairpins are formed with equal length legs and full pitches within each winding set, except 2 hairpins/coils per phase are formed with short pitch (i.e., $\tau$–1) in each winding set due to wave-wound features. The shift of alignment position between winding sets is taken about $(1/6)\tau$ to suppress the $5^{th}$ and $7^{th}$ harmonics, or $(1/v)\tau$ to eliminate the $v^{th}$ harmonic.

Figure 11:
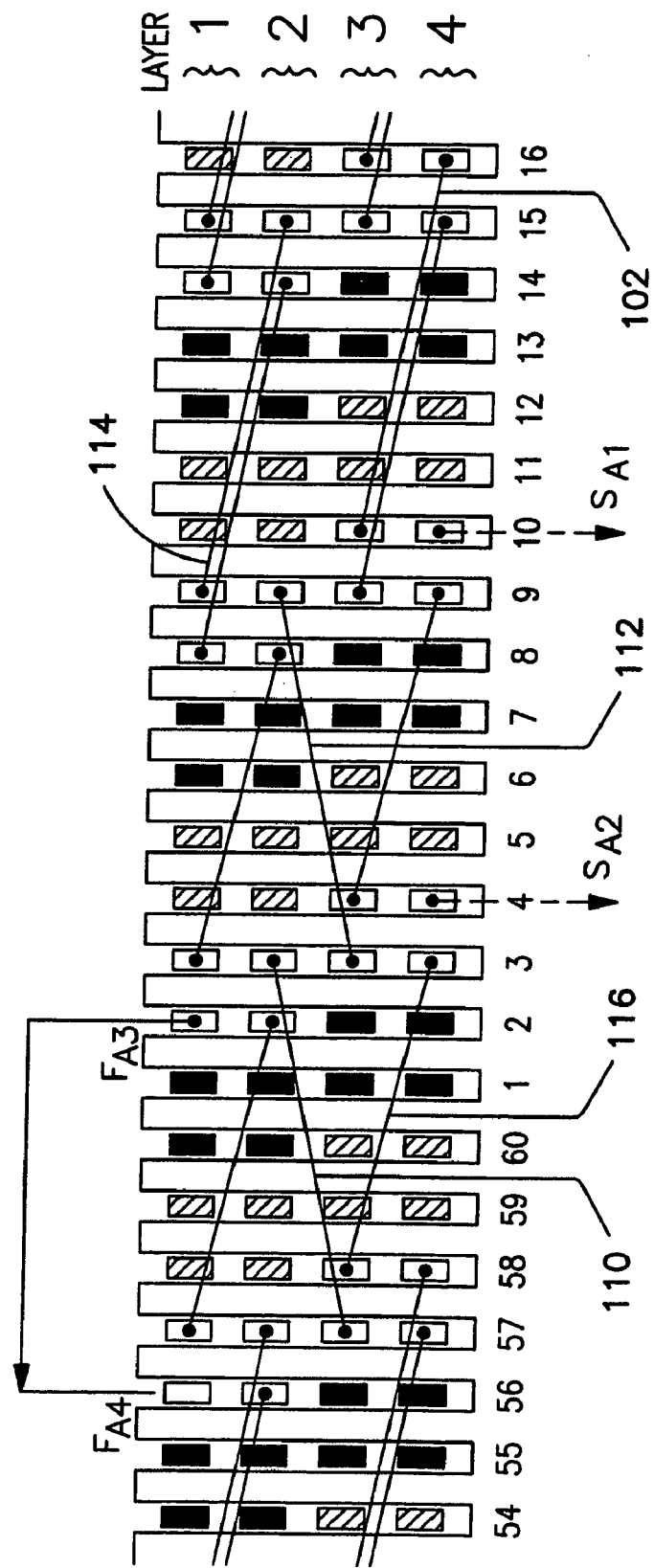
FIG. 11 shows the end-turn connections of one winding phase for a double winding set having hairpin legs of equal lengths.
Figure 12:
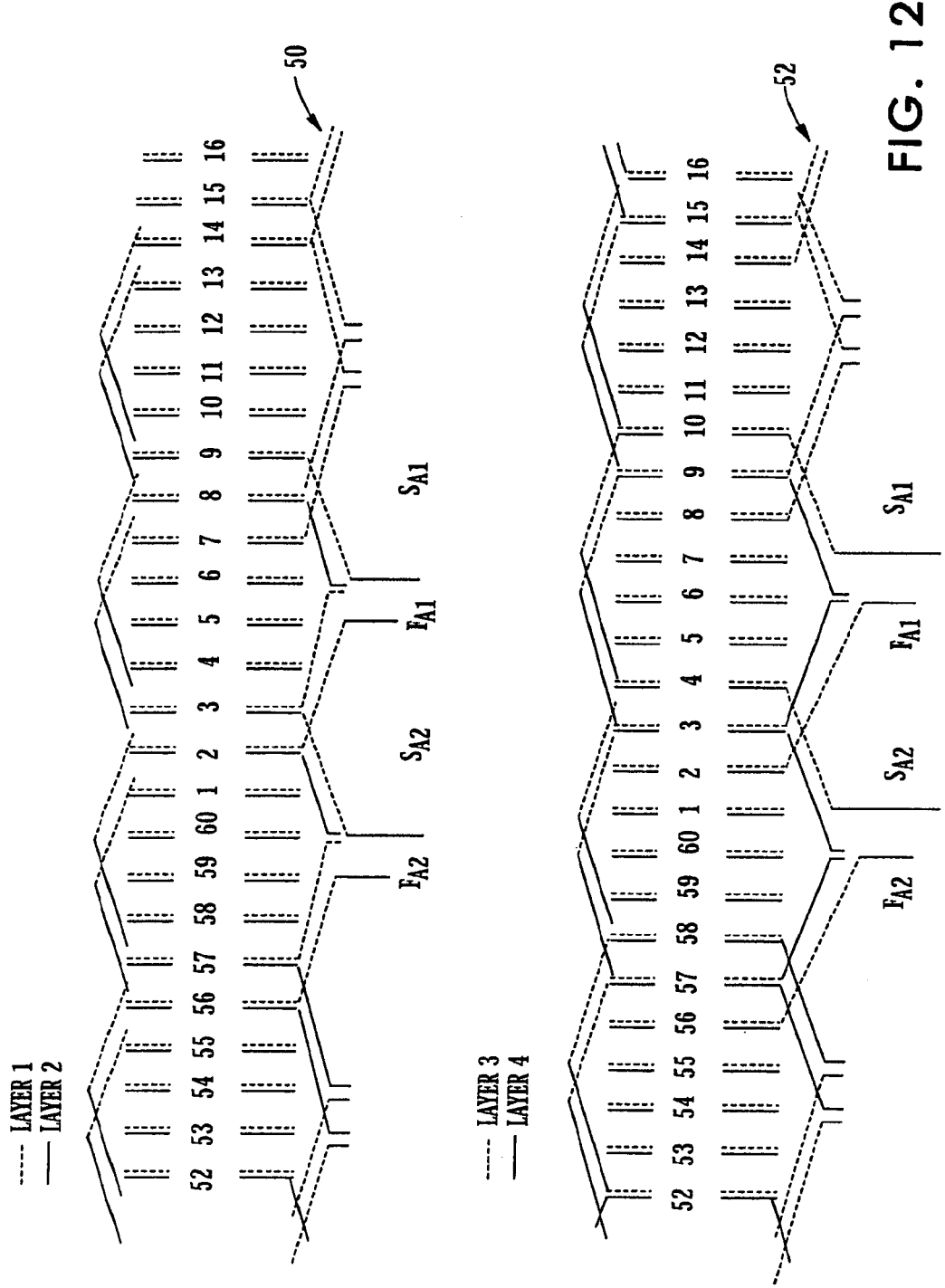
FIG. 12 shows a distributed graph of two sets of rectangular copper hairpin windings for the double winding set of FIG. 11.

As an example, again consider a three phase, two-set AC windings with 10 poles and 60 slots, such as that shown in FIG. 20. A detailed look at the end-turn jumpers and some connections that are required for phase A of this arrangement is shown in FIGS. 11 and 12. In this example, the layers are defined as the $1^{st}$ through $4^{th}$ from the top to the bottom of a slot. The $1^{st}$ & $2^{nd}$ layers consist of winding set 1 while the $3^{rd}$ & $4^{th}$ layers consist of winding set 2. All hairpins have equal length legs (except for the legs of two hairpins per phase per set, as mentioned above) and each leg is bent three slots. The second pitch $Y_2$ (connection pitch within a set) is six slots as shown starting with layer 1 of slot 9 and following reference number 114 to layer 2 of slot 15. The first pitch (hairpin pitch) is also 6 slots. It should also be noted that there exist 2 connections per phase per set that have a shorter $Y_2$ by one slot (e.g., starting at layer 3 in slot 58 and ending at layer 4 in slot 3, as represented by reference line 116, the second winding pitch is only 5 instead of 6). The connection pitch between winding sets 1 & 2 is 6 (e.g., as shown by reference line 110, starting at layer 3 in slot 57 and ending at layer 2 in slot 3). Connections between $F_{A2}$ & $S_{A4}$ 110 and $F_{A1}$ & $S_{A3}$ 112 in FIGS. 12 and 20 are simply made because the connection is made between adjacent leg ends between the second and third layer. The series path under north poles and the path under south poles are connected into one or two paths based on design. In this example, connecting $F_{A4}$ & $F_{A3}$ using jumpers yields one series path per phase.

Comparing FIGS. 11 and 12 with FIGS. 9 and 10, the combination of two winding sets with full pitch hairpin coils in FIGS. 11 and 12 shows the same winding factors for both fundamental and harmonics as the combination of two winding sets with short pitch hairpin coils in FIGS. 9 and 10. With respect to either MMF or main EMF, after shifting one or more slots between sets, the full pitch hairpin windings with equal legs is nearly equivalent to the short pitch hairpin windings with unequal legs. The hairpins with equal legs have the shorter end-turn length than hairpins with unequal legs. It should be noticed, however, that this advantage is a trade-off with slightly higher skin effect in slots containing different phase current carriers since the phase conductor combination for the hairpins with equal legs, in slots with different phase current carriers, belongs to the type shown in FIG. 6(b). In particular, the first two layers (i.e., the conductors included in the first winding set) in all of the even numbered slots carry a first phase current that is different than a second phase current carried in layers three and four (i.e., the conductors included in the second winding set). At the same time, all of the layers in the odd numbered slots carry the same phase current. Accordingly, the conductor arrangement alternates between the configuration shown in FIG. 6(a) and the configuration shown in FIG. 6(b). The improved skin effect in the even numbered slots is nearly equal to that realized in the above embodiment having unequal leg lengths.

Because small and mid-sized electric machines typically use semi-closed slots, hairpin windings are used to accomplish the above-described winding configurations (there are also benefits to semi-closed slots as previously mentioned). For simplicity, only a portion of the phase A winding set is shown in FIGS. 9–12, but the complete winding arrangement for phases A, B and C is provided in FIGS. 19 and 20.

Utilizing a combination of shifting angle/slots between pairs of winding sets can create various equivalent short pitches. As an example, 4-sets of full pitch windings can be broken into two groups of two-set windings. If the shift angle between the two-sets in the first group is $(1/9)\pi$ while the shift angle between two-sets in the second group is $(2/9)\pi$, the equivalent winding pitch of the 4-set windings is $(7.5/9)\pi$, which provides suppression of both the $5^{th}$ and $7^{th}$ harmonics, which is better than using a winding pitch of $(7/9)\pi$ or $(8/9)\pi$. This method provides much more flexibility in choosing winding pitches, which cannot be done in traditional double layer windings.

The above descriptions with reference to FIGS. 9–12 and 19 and 20 have included only two-sets of rectangular copper hairpin windings in an attempt to simplify the description. However, alternative embodiments may certainly include more than two-sets of windings.

(iii) Separation of Hairpin Connections with Phase Terminal Connections

Figure 5A:
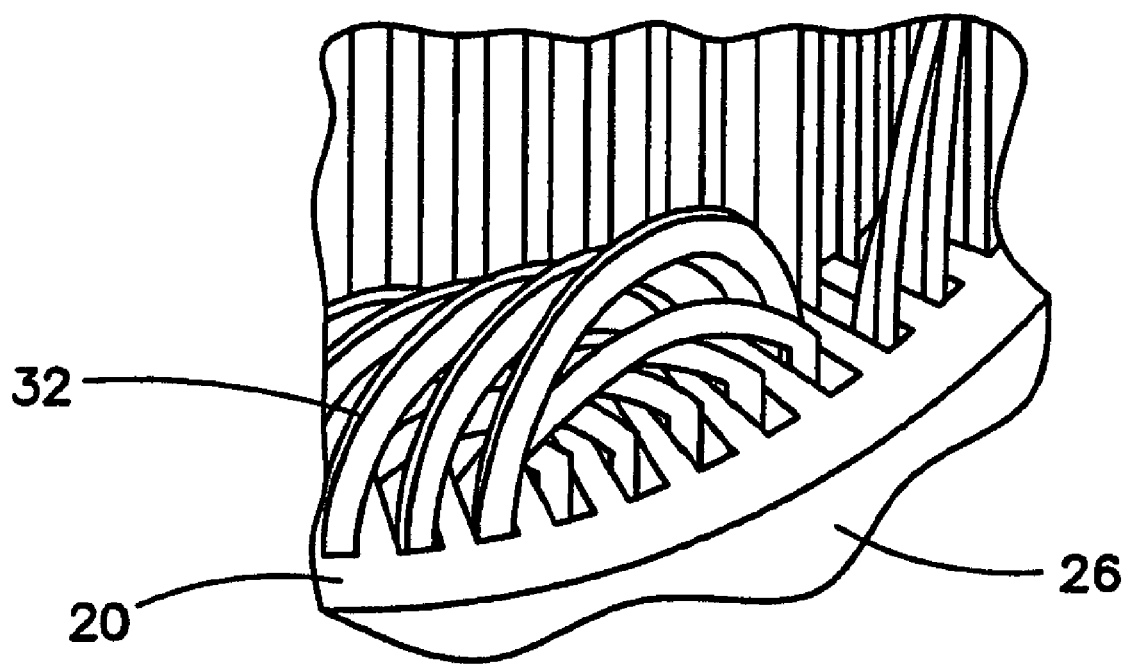
FIG. 5(a) shows an overlapping hairpin winding arrangement having two sets of windings.
Figure 5B:
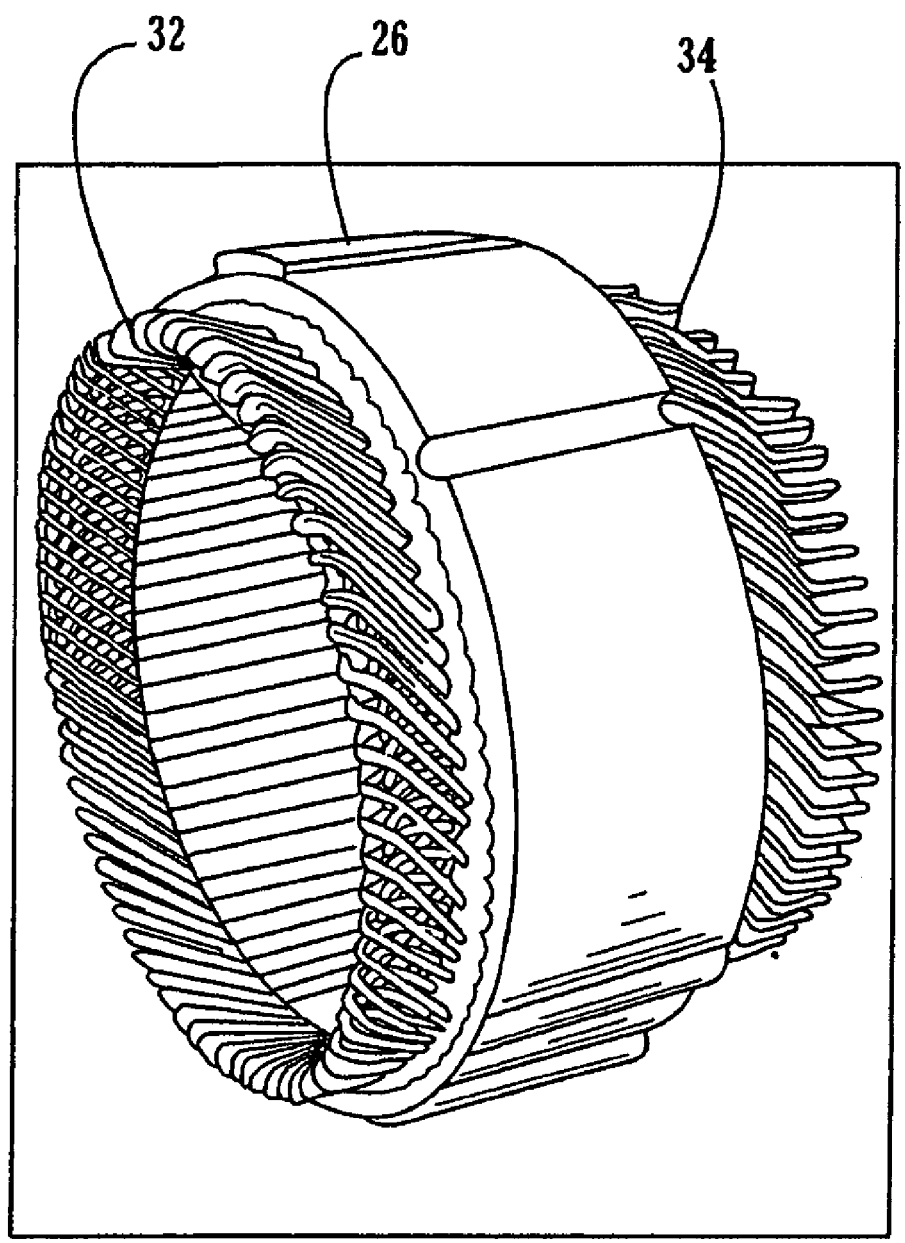
FIG. 5(b) shows a stator wound with the overlapping winding arrangement of FIG. 5(a)

Conventionally, the phase terminal connections and the hairpin connections are at the same end of armature stack, such as in FIG. 3(b) and FIG. 8(b). Those arrangements do not affect the manufacturing procedures in making manual welded connections. However, it is difficult to weld all connection points in automatic welding by mechanical arms because the longer phase terminal wires in the way. Thus it will be helpful to separate the hairpin connections with phase terminal connections, i.e., the hairpin connections are arranged on one end of the armature stack and all phase terminal connections are located on the other end of the armature stack. As a result, all connection points are uniformly and neatly placed at the same axial level on the hairpin connection end of the armature, which makes the welding process easily performed by mechanical arms automatically. At the same time, the connection points are not aligned over each other in the radial direction on the other end of the armature so the potential short circuits between welding points are avoided. Unlike the phase terminals coming out between hairpins as shown in FIG. 5(b), the phase terminals come out either from the inner diameter or the outer diameter of overall end-turns.

Figure 13:
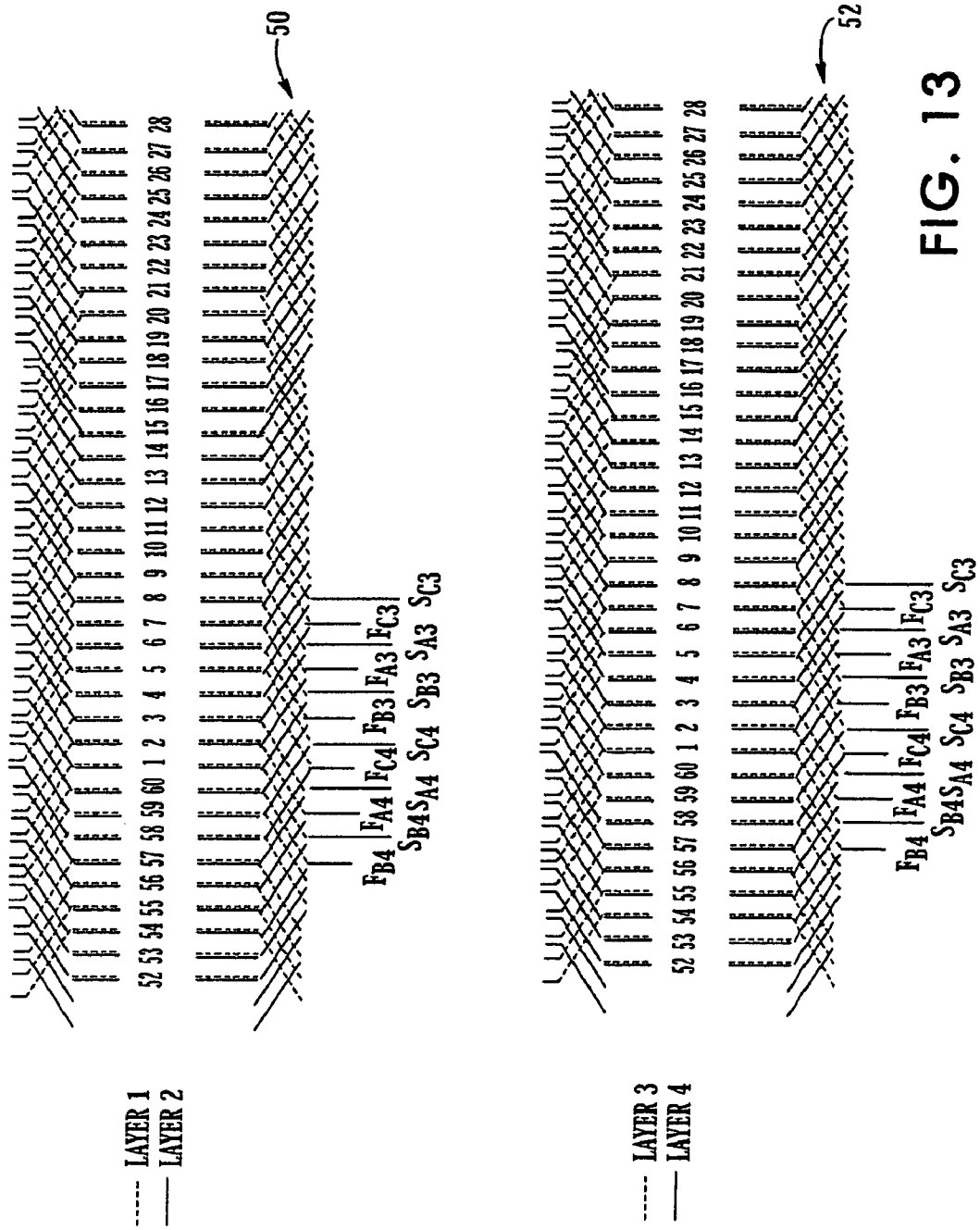
FIG. 13 shows the hairpin connection points and phase terminal arrangements of FIGS. 11 and 12.

To clearly show the location of hairpin connections and phase terminals, the windings in the examples of FIGS. 11 and 12 are redrawn in FIG. 13, with all phases shown. The rectangular copper hairpins are inserted into the slot from one end of the armature while the connection points consisting of bent rectangular hairpin legs are located at top of the distributed winding drawing of each set in FIG. 13. The phase terminals and connections of the two-sets (4 layers of coil sides of each slot) in the rectangular copper hairpin windings are described as follows:

Phase A: (I) Connect $F_{A1}$ of layer 3 and $S_{A3}$ of layer 2
  (II) Connect $F_{A2}$ of layer 3 and $S_{A4}$ of layer 2
Phase B: (I) Connect $F_{B1}$ of layer 3 and $S_{B3}$ of layer 2
  (II) Connect $F_{B2}$ of layer 3 and $S_{B4}$ of layer 2
Phase C: (I) Connect $F_{C1}$ of layer 3 and $S_{C3}$ of layer 2
  (II) Connect $F_{C2}$ of layer 3 and $S_{C4}$ of layer 2

In this example, three phase windings are connected in one series path per phase with an Y-connection of the three phases. $F_{A3}$ & $F_{A4}$ of phase A, $F_{B3}$ & $F_{B4}$ of phase B and $F_{C3}$ & $F_{C4}$ of phase C are connected in series, respectively. $S_{A1}$, $S_{B2}$ and $S_{C2}$ are connected to the neutral. $S_{A2}$, $S_{B1}$ and $S_{C1}$ are left for three phase terminals A, B and C.

Example Simulation Results

The following data is an example simulation to show the improvement on performance and machine size with the disclosed winding technology.

A three phase induction machine (Machine I) is provided as follows: 2P=10 poles; stator/rotor slots $Z_1/Z_2$=90/112; q=3 slots per phase per pole; coil pitch $Y_1$=8 slots; $N_c$=13 turns per coil; a=10 parallel paths; wire size 2×AWG#18½; slot-fill-ratio=42%; double layer lag windings; Y-connection; stator ID/OD=293.52/369.56 mm; stator length L=127.5 mm, end turn length (two sides) Le=58+34=92 mm.

A rectangular copper hairpin winding (Machine II) is provided as follows: windings S=2 sets, 2p=10 poles; stator/rotor slots $Z_1/Z_2$=60/64; q=2 slots per phase per pole; coil pitch $Y_1$=5 slots; $N_c$=1 turns per coil; a=1 parallel paths; wire size W6.7 mm×H3.35 mm; slot-fill-ratio=67%; double layer wave windings each set; Y-connection; stator ID/OD=293.52/369.56 mm; stator length L=127.5 mm; end turn length (two sides) Le=40+32=72 mm.

Figure 14:
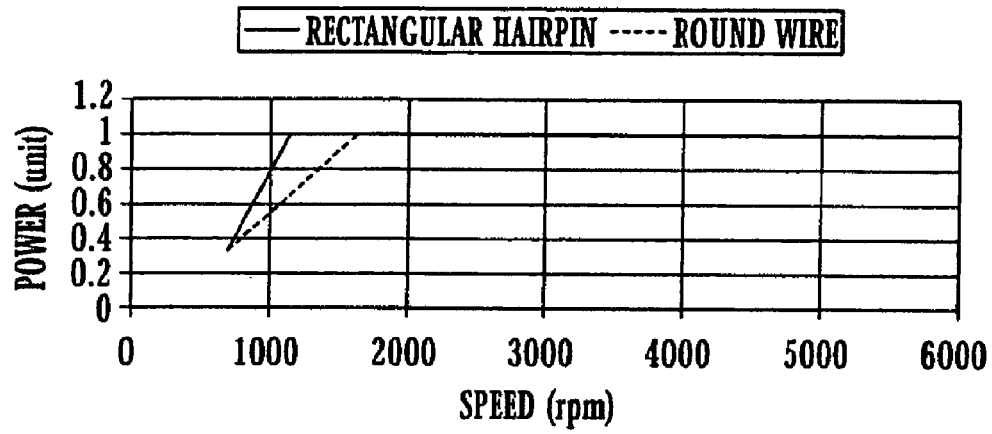
FIG. 14 shows a comparison of generating characteristics between electric machines using multi-set rectangular copper hairpin windings and an electric machine using traditional round wire windings.

After changing the stator windings from round wire to two-set rectangular hairpin windings, the output power of the machine increases at low speed range under the same limitation of AC current or the same Volt-Ampere (VA) capability of the power electronic converter, shown in FIG. 14. If the thermal load or total loss of the machine is used as criterion, the difference of output power between the patented machine and conventional machine with round wires will increase further because of high slot-fill-ratio and low AC phase resistance in the low speed range. The improvement on power generation at low speed is very attractive for HEV's.

Figure 15:
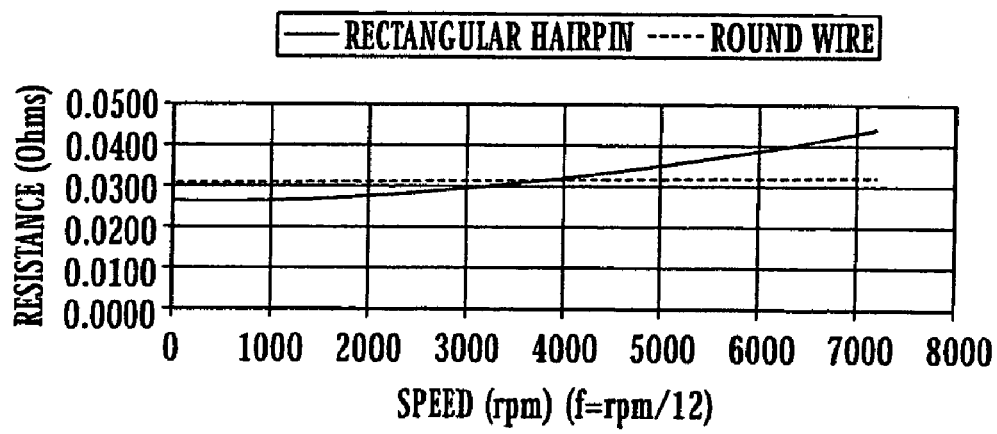
FIG. 15 shows a comparison of AC phase resistances between electric machines using multi-set rectangular copper hairpin windings and an electric machine using traditional round wire windings.
Figure 16:
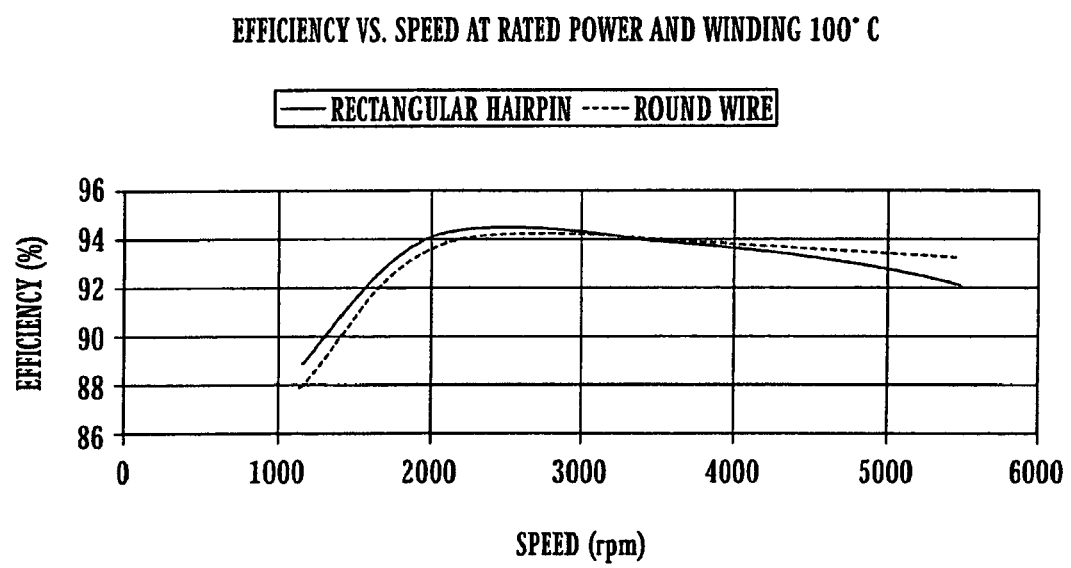
FIG. 16 shows a comparison of motoring efficiencies between electric machines using multi-set rectangular copper hairpin windings and an electric machine using traditional round wire windings.

As discussed previously, the provided embodiments of the multi-set rectangular copper hairpin windings addresses the skin effect, or increase of AC resistances in the electric machine if the conductor height in slots are not small enough. The AC resistances are calculated under the worst situation (i.e., open slots, as the practical AC resistance should be lower in windings with semi-closed slots). For two winding sets (4 layers of rectangular conductor with the thickness of about 3.5 mm), FIG. 15 shows that the AC phase resistance in the patented winding is lower than that in traditional round wire windings until approximately 3500 rpm. In fact, the electric machine generally operates below 3500 rpm, and seldom runs near the engine's red line speed of 5500 rpm for direct drive configuration. Increasing the number of winding sets will lower the skin effect and consequently the AC resistance. Combining manufacturing cost with machine performance, however, two-set rectangular copper hairpin windings already fit this application very well. The efficiency curve at full-load and motoring operation of the patented machine is given in FIG. 16, in which the skin effects are included. The performance curves show a big improvement at low speed while slightly sacrificing performance in the red-line speed range.

The winding design disclosed herein demonstrates improvements for direct surface oil cooling systems. No additional end-turn insulation is required on the windings because of the existence of space (clearance) between end-turn conductors. As a result, thermal transfer capability and manufacturing cost are improved. Furthermore, the side-by-side winding arrangement provides for more oil flow over the end turns than with overlapping coil wound designs.

In addition to the above, the winding design disclosed herein provides for reduced overall length of the electric machine. In particular, the end-turn length (and the overall length of the machine) is reduced by about 20 mm when compared to overlapping winding designs. This is accomplished because of short end-turns and the absence of an AC bus at the end-turn area.

In addition to the above advantages, the winding design disclosed herein provides for an electric machine having a high slot-fill-ratio (e.g., up to 75% ratio of area of bare wires to total slot cross section area), high efficiency at low rpm, lower manufacturing costs, a large end-turn heat rejection area, high heat conductivity in the slots, and ease of winding maintenance and repair (as compared to overlapping winding arrangements).

The electric machine having multi-set hairpin windings as described herein is particularly applicable for use with hybrid vehicles in the automobile and truck industries. However, the hairpin wound electric machine having multi-set hairpin windings described herein may also be used in any three-phase (or any phase number) AC electric machine (both motor and generator) required to operate efficiently over a wide speed range. As described above, the electric machine provides high slot-fill-ratio (up to 75% bare copper to slot area ratio) and reduces the negative skin effects of AC windings, leading to higher efficiency of the electric machine and lower fuel consumption (saving energy) for environmentally friendly hybrid electric vehicles or pure electric vehicles.

Although the present invention has been described in considerable detail with reference to certain preferred versions thereof, other versions are possible. For example, the wave winding connection described above reduces jumper-wires between poles, so the coil turns per phase can not be chosen flexibly and the parallel paths per phase can be only one or two in order to avoid the use of an AC bus at end-turns. However, to increase the flexibility in selection of the winding series turns per phase, the slot number and the number of winding sets can be changed. For example, the number of stator slots can be 60, 90 and 120 for 10 pole three phase machine windings, and the winding sets can be chosen as 2, 3 or more. Some fractional slot windings can be introduced to further increase the flexibility. These provide more choices for winding turns. At the same time, changing lamination stack length also can adapt the design to a wide range of voltage at a given number of turns per phase. This becomes possible because a shorter end-turn in the invented windings provides more flexibility in selecting stack length to keep the overall length of machine within available space. Furthermore, changing pole number in machine design can also adapt to some available winding turns provided by the disclosed winding technology. In addition, the manufacturing cost increase due to the number of welding points can be reduced through the introduction of an automatic welding process since the adjacent end-turns provide potential for an automatic production line. Therefore, the spirit and scope of the appended claims should not be limited to the description of the preferred versions contained herein.

What is claimed is:

1. An electric machine comprising:
a stator having a substantially cylindrical interior, said stator comprising a plurality of stator slots;
a first plurality of hairpin conductors positioned in said stator slots in a short pitch arrangement to form a first winding set, said first plurality of hairpin conductors each including an end turn and two legs of unequal length, said legs of unequal length of each of said first plurality of hairpin conductors bent outward to generally follow the circumference of said stator, wherein the longer of said legs of unequal length of each of said first plurality of hairpin conductors is bent in a first circumferential direction and the shorter of said legs of unequal length of each of said first plurality of hairpin conductors is bent in a second circumferential direction;
a second plurality of hairpin conductors positioned in said stator slots in a short pitch arrangement to form a second winding set, said second winding set being substantially concentric with said first winding set, said second plurality of hairpin conductors each including an end turn and two legs of unequal length, said legs of unequal length of each of said second plurality of hairpin conductors bent outward to generally follow the circumference of said stator, wherein the shorter of said legs of unequal length of each of said first plurality of hairpin conductors is bent in said first circumferential direction and the longer of said legs of unequal length of each of said second plurality of hairpin conductors is bent in said second circumferential direction; and
at least one electrical connection between said first winding set and said second winding set, said at least one electrical connection made by joining at least one leg of said first plurality of hairpin conductors to at least one adjacent leg of said second plurality of hairpin conductors.

2. The electric machine of claim 1, further comprising:
at least one other plurality of hairpin conductors positioned in said stator slots in a short pitch arrangement to form at least one other winding set, said at least one other winding set being substantially concentric with said first winding set.

3. The electric machine of claim 1, further comprising:
hairpin conductor insulation, said hairpin conductor insulation applied to at least one of said first plurality of hairpin conductors before said first plurality of hairpin conductors are positioned in said stator slots.

4. The electric machine of claim 1, wherein said first plurality of hairpin conductors and said second plurality of hairpin conductors are positioned in said stator slots such that said end turns protrude from a first axial end of said stator and said legs protrude from a second axial end of said stator, the electric machine further comprising:
at least one terminal, said at least one terminal electrically connected to at least one said end turn.

5. An electric machine comprising:
a stator having a substantially cylindrical interior, said stator comprising a plurality of stator slots;
a first plurality of hairpin conductors positioned in said stator slots in a full pitch arrangement to form a first winding set, said first winding set arranged to carry at least one electrical phase, said first plurality of hairpin conductors each including an end turn and two legs of equal length, said legs of equal length of each of said first plurality of hairpin conductors bent outward to generally follow the circumference of said stator;
a second plurality of hairpin conductors positioned in said stator slots in a full pitch arrangement to form a second winding set, said second winding set arranged to carry said at least one electrical phase, said second winding set being substantially concentric with said first winding set, said second winding set being offset by at least one slot with respect to said first winding set, said second plurality of hairpin conductors each including an end turn and two legs of equal length, said legs of equal length of each of said second plurality of hairpin conductors bent outward to generally follow the circumference of said stator; and
at least one electrical connection between said first winding set and said second winding set, said at least one electrical connection made by joining at least one leg of said first plurality of hairpin conductors to at least one adjacent leg of said second plurality of hairpin conductors.

6. The electric machine of claim 5, further comprising:
at least one other plurality of hairpin conductors positioned in said stator slots in a full pitch arrangement to form at least one other winding set, said at least one other winding set being substantially concentric with said first winding set.

7. The electric machine of claim 5, further comprising:
hairpin conductor insulation, said hairpin conductor insulation applied to at least one of said first plurality of hairpin conductors before said first plurality of hairpin conductors are positioned in said stator slots.

8. The electric machine of claim 5, wherein said first plurality of hairpin conductors and said second plurality of hairpin conductors are positioned in said stator slots such that said end turns protrude from a first axial end of said stator and said legs protrude from a second axial end of said stator, the electric machine further comprising:
at least one terminal, said at least one terminal electrically connected to at least one said end turn.

9. A hairpin wound stator for an electric machine, the stator comprising:
a plurality of partially closed stator slots;
a first winding set positioned in said stator slots, said first winding set comprising a first plurality of hairpins forming a first layer of conductors in said stator slots and a second layer of conductors in said stator slots, said first plurality of hairpins each including one end turn joining two legs with leg ends and each leg end bent to a desired configuration to form adjacent leg ends between said first layer of conductors and said second layer of conductors;
a second winding set positioned in said stator slots, said second winding set comprising a second plurality of hairpins forming a third layer of conductors in said stator slots and a fourth layer of conductors in said stator slots, said second plurality of hairpins each including one end turn joining two legs with leg ends and each leg end bent to a desired configuration to form adjacent leg ends between (i) said second layer of conductors and said third layer of conductors and (ii) said third layer of conductors and said fourth layer of conductors; wherein said second winding set is joined to said first winding set by connecting at least one of said adjacent leg ends between said second layer of conductors and said third layer of conductors; and
at least one terminal, said at least one terminal electrically connected to at least one said end turn.

10. The electric machine of claim 9, further comprising:
at least one other winding set positioned in said stator slots.

11. The hairpin wound stator of claim 9, further comprising:
hairpin conductor insulation, said hairpin conductor insulation applied to at least a one of said first plurality of hairpins before said first plurality of hairpins are positioned in said stator slots.

* * * * *